(12) United States Patent
DaCosta et al.

(10) Patent No.: US 7,583,648 B2
(45) Date of Patent: Sep. 1, 2009

(54) MANAGING LATENCY AND JITTER ON WIRELESS LANS

(75) Inventors: Francis DaCosta, Santa Clara, CA (US); Sriram Dayanandan, Santa Clara, CA (US)

(73) Assignee: MeshDynamics, Inc., Santa Clara, CA (US)

( * ) Notice: Subject to any disclaimer, the term of this patent is extended or adjusted under 35 U.S.C. 154(b) by 290 days.

(21) Appl. No.: 11/266,884

(22) Filed: Nov. 4, 2005

(65) Prior Publication Data

US 2006/0056442 A1 Mar. 16, 2006

Related U.S. Application Data

(63) Continuation-in-part of application No. 11/084,330, filed on Mar. 17, 2005, and a continuation-in-part of application No. 10/434,948, filed on May 8, 2003.

(60) Provisional application No. 60/696,144, filed on Jun. 30, 2005.

(51) Int. Cl.
*H04W 4/00* (2006.01)
(52) U.S. Cl. ..................................... 370/338
(58) Field of Classification Search ................ 370/230, 370/328, 338, 342, 349, 352; 455/456.4
See application file for complete search history.

(56) References Cited

U.S. PATENT DOCUMENTS

| | | | | |
|---|---|---|---|---|
| 5,717,688 | A * | 2/1998 | Belanger et al. | 370/331 |
| 6,917,598 | B1 * | 7/2005 | Emeott et al. | 370/311 |
| 7,043,195 | B2 * | 5/2006 | Bunton et al. | 455/11.1 |
| 7,103,371 | B1 * | 9/2006 | Liu | 455/456.4 |
| 7,158,803 | B1 * | 1/2007 | Elliott | 455/512 |
| 7,440,436 | B2 * | 10/2008 | Cheng et al. | 370/338 |
| 2004/0151129 | A1 * | 8/2004 | Kun-Szabo et al. | 370/254 |
| 2005/0073990 | A1 * | 4/2005 | Chang et al. | 370/349 |
| 2005/0107103 | A1 * | 5/2005 | Melpignano | 455/502 |
| 2005/0135295 | A1 * | 6/2005 | Walton et al. | 370/328 |
| 2005/0135302 | A1 * | 6/2005 | Wang et al. | 370/329 |
| 2005/0165950 | A1 * | 7/2005 | Takagi et al. | 709/236 |
| 2005/0192037 | A1 * | 9/2005 | Nanda et al. | 455/509 |
| 2005/0201340 | A1 * | 9/2005 | Wang et al. | 370/337 |
| 2005/0243765 | A1 * | 11/2005 | Schrader et al. | 370/328 |
| 2005/0249114 | A1 * | 11/2005 | Mangin et al. | 370/229 |
| 2005/0254459 | A1 * | 11/2005 | Qian | 370/328 |
| 2006/0028984 | A1 * | 2/2006 | Wu et al. | 370/230 |

(Continued)

FOREIGN PATENT DOCUMENTS

WO  WO-2005/008967  *  1/2005

*Primary Examiner*—Lester Kincaid
*Assistant Examiner*—Nathan Mitchell
(74) *Attorney, Agent, or Firm*—Cherskov & Flaynik

(57) ABSTRACT

In order to better manage VoIP transmissions between an AP and multiple voice client devices, methods are described that use synchronization techniques combined with packet concatenation to greatly reduce latency and jitter while enabling a much larger number of simultaneous conversations than would otherwise be possible. A TDMA-style methodology is superimposed over the standard CSMA/CA mechanism of 802.11 to provide the benefits of both mechanisms while remaining fully compatible with an industry standard protocol. The synchronization/concatenation mechanism may be optionally used in conjunction with a wireless mesh network to provide enhanced roaming as well as the ability for concatenated VoIP packets to be distributed over a wider area, and in much greater quantity, through the mesh.

16 Claims, 25 Drawing Sheets

U.S. PATENT DOCUMENTS

2006/0078001 A1* 4/2006 Chandra et al. ............. 370/473
2006/0146868 A1* 7/2006 Ginzburg .................... 370/465
2006/0164969 A1* 7/2006 Malik et al. ................. 370/203
2006/0203795 A1* 9/2006 Welborn et al. ............. 370/345
2006/0256765 A1* 11/2006 Shih et al. ................... 370/346
2006/0268792 A1* 11/2006 Belcea ........................ 370/338

* cited by examiner

VoIP Packet Inefficiency

- Typical Data Packet = 1500 bytes (1.44mS, incl .4mS ovhd)
- VoIP Packet (G.711 Codec) = 230 bytes (.56 mS, incl .4mS ovhd)
- VoIP Packet (G.729 Codec) = 90 bytes (.46, incl .4mS ovhd)
- Multiple VoIP Packets Concatenated into a Single Container Packet = 1500 bytes (1.44mS, incl .4mS ovhd)

Terminology

501 — PACKET - the base element

A packet consists of the isochronous data with information about source and destination

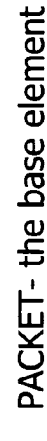

502 — CONTAINER - a collection of packets that fit into a 802.11x (2300 Bytes)

A collection of PACKET's sent out together on one Layer-2 transmission. Number of packets in the container is driven by the size of the packet, which in turn depends on the CODEC employed.

Since the Containers operate on the wireless side, the container size is 2300 Bytes.

503 — SHIPMENT – an ordered collection of Containers

A collection of CONTAINERs sent out on one Layer-2 medium. There may be more clients to be services than can be fitted into a standard container of approx 2300 bytes.

The shipment is therefore a convoy of containers.

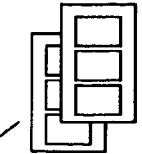

MANAGING LATENCY AND JITTER ON WIRELESS LANS

CROSS-REFERENCE

This application claims the benefit of priority from U.S. Provisional Application No. 60/696,144, filed Jun. 30, 2005, and is a continuation-in-part of U.S. application Ser. No. 11/084,330 filed Mar. 17, 2005, which is a continuation-in-part of U.S. application Ser. No. 10/434,948, filed May 8, 2003, all of which are herein incorporated by reference as well as previous U.S. application Ser. No. 11/036,297 filed Jan. 7, 2005 which is incorporated by reference including the benefit of priority.

FIELD OF THE INVENTION

This patent application focuses on time sensitive periodic transmissions such as VOIP (Voice over Internet Protocol) and IP-Video. Both VOIP and IP-Video clients require a time bound means to communication with the wireless Access Point that is servicing them, and are therefore very sensitive to latency and jitter. Factors affecting the overall efficiency of communication when large numbers of VoIP or Video transmissions are required are also addressed.

In order to explain the technique VOIP phone calls will be used as an example. However the technique described is applicable to all forms of periodic transmissions including but not restricted to IP-Video, scanning camera updates, or any other type of sensor transmissions sent and/or received on a periodic basis.

BACKGROUND OF THE INVENTION

There is increasing interest in employing one network to support video, voice and data traffic. Currently, the video, voice and data networks are distinct since each addresses differing latency and bandwidth requirements. The challenge lies in providing—within the same network—the ability to address potentially conflicting latency and throughput needs of diverse applications.

For example, voice needs to be transmitted with low delay (latency). Occasionally lost voice packets, while undesirable, are not fatal for voice transmissions. Conversely, data transmissions mandate delivery of all packets and while low latency is desirable, it is not essential. In essence transmission across the wireless network should (ideally) be driven by the needs of the application.

The techniques described in this application focus on time sensitive periodic transmissions such as VOIP (Voice over Internet Protocol) and IP-Video. VOIP and IP-Video clients require regularly spaced time intervals to communicate with the wireless base station or wireless Access Point (AP) servicing them.

To explain the technique, VOIP phone calls will be used as an example in this application. However the technique described is applicable to all forms of periodic transmissions including but not restricted to IP-Video, scanning camera updates, or any other type of sensor transmissions sent and/or received on a periodic basis.

Note that some of the material contained herein is also described in C.I.P. Ser. No. 11/084,330 filed Mar. 17, 2005. In that context the previous application provided a voice container to transport voice packets in bulk up and down the backhaul path of a multiple-hop wireless mesh network. Here, the same VOIP concatenation engine is also being used to communicate with multiple voice devices associated with an AP radio. The previous patent application focused on the backhaul path, while this application focuses on the client software on voice devices to take advantage of voice concatenation while making the communication between voice devices and APs far more efficient that exists today on industry standard protocols. Prior art references that relate to voice packet synchronization in wireless LAN applications include published U.S. Patent Applications Nos. 2002/0150048 to Ha et al. and 2003/0048751 to Han et al.

SUMMARY OF THE INVENTION

Radio transmission between multiple voice devices and a single AP radio are coordinated by the AP to ensure that all voice devices get a non-overlapping periodic time slice of connectivity to send packets and a synchronized time slot to receive packets. The client device radios request and are assigned a time interval. All client devices operating in the same vicinity get a unique specified time interval to send and another time interval that they all share, to receive. For the receive direction, a bulk shipment is sent simultaneously to all voice devices from which they each choose the voice packets that are meant for them.

Note that for the G.771 and G729 CODEC, the time interval between sends from the perspective of each voice device is 20 ms. Also, note as shown in FIG. 4 that the time taken for radio transmission is less than 1 ms each way. There is therefore 18 ms of excess (unallocated) time available for each voice device to perform other functions, e.g.
  1. Scanning for a better (more powerful signal) base station
  2. Switching to another channel and transmitting data packets on that channel
  3. Then switching back to the voice channel to either send or receive Voice packets One way to ensure that this excess time is well utilized is to consolidate the packets sent back from the AP to the voice devices. The conventional form of send/receive is to send packets from the AP to each voice device at regularly spaced intervals. A variation described herein is for AP to consolidate the packets sent back from the AP to individual voice devices as one large container packet containing all the packets for all voice devices. This consolidated (concatenated) packet is also very compatible with the concatenation method disclosed in U.S. application Ser. No. 11/084,330 filed Mar. 17, 2005, where packet concatenation was used for transmission along the backhaul (relay) path within a mesh network.

This container-based approach is more efficient than sending individual packets since the overhead of the wireless transmission is reduced for larger packet sizes. This increases the amount of unused time available and therefore supports more simultaneous phone conversations. It also enables the voice device to use some of that time for data transmissions or other functions.

With these techniques in place, wireless voice devices have sufficient time to provide both VOIP and Data services and also meet the timing constraints for low latency and jitter. Additionally, the capacity of the network to support more VOIP calls is increased.

BRIEF DESCRIPTION OF DRAWINGS

In order to more fully describe embodiments of the present invention, reference is made to the accompanying drawings. These drawings are not to be considered limitations in the scope of the invention, but are merely illustrative.

FIG. 5 describes some of the terminology used in the present disclosure relative to packet concatenation.

DETAILED DESCRIPTION OF SPECIFIC EMBODIMENTS

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention.

Radio is a shared medium where only one person can be "talking" at a time. As networks grow, performance degrades rapidly as more clients are serviced by the same AP. The AP's Basic Service Set (BSS) becomes unmanageable. The need to split up the network into smaller groups is essential to the health of a network.

Figure 14:
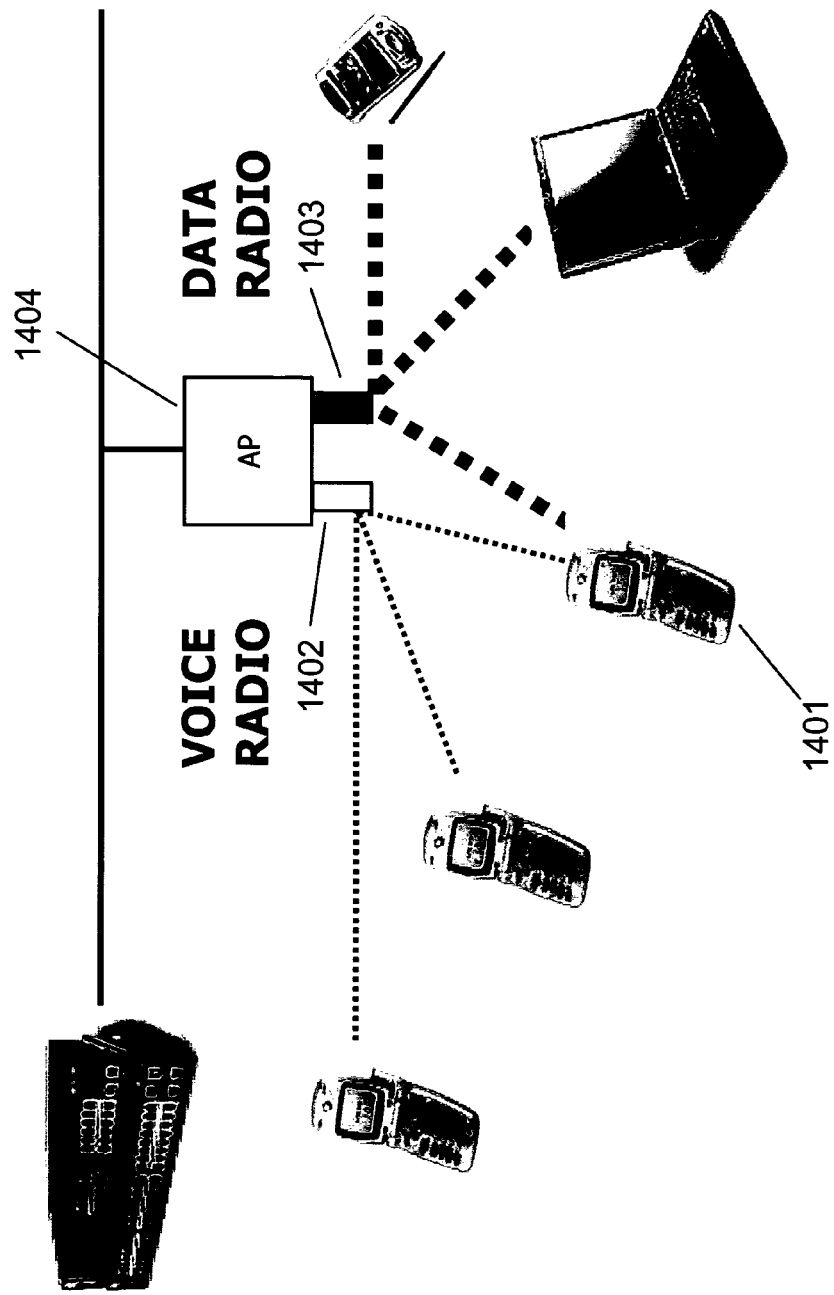
FIG. 14 shows a voice device talking to both voice and data radios on a dual radio Access Point.

One solution is to split up the wireless network at each location into a Voice and Data service set with separate radios operating on different non-interfering channels, similar to the configuration shown in FIG. 14. This is an improvement since the contention window has been reduced for each service set compared with having all clients shown operating in the same service set. However, without a method for coordination and synchronizing the voice packets, they will still be contending with each other on the voice AP radio. Latency and jitter may increase beyond the controlled limits as the number of voice devices increases, producing greater associated contention delays and resultant jitter. Some form of coordination is needed, especially for voice packets.

Figure 1:
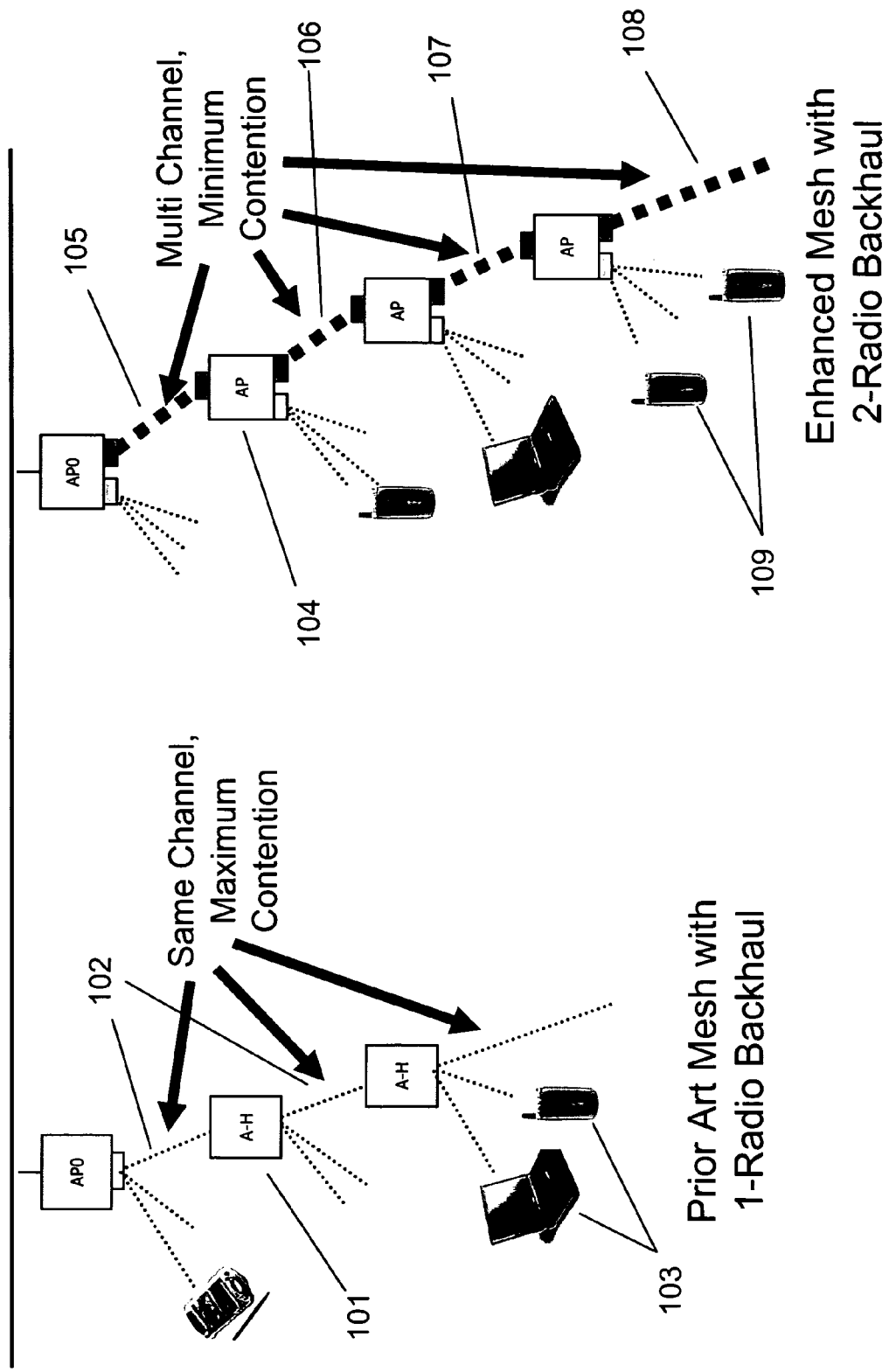
FIG. 1 illustrates the contention on a conventional 1-radio mesh compared with a mesh having a 2-radio backhaul path.

While most of the methods described in this application can be used with APs that are directly connected to a wired network, these methods are especially useful when used in conjunction with a wireless mesh network, in particular a mesh network with a 2-radio backhaul architecture as described in previously filed application Ser. No. 11/084,330. The preferred architecture of application Ser. No. 11/084,330 is shown in FIG. 1 compared with a popular 1-radio wireless mesh architecture. For the 1-radio (ad hoc) mesh, mesh node 101 communicates with other mesh nodes via wireless backhaul or relay link 102 and also communicates with clients 103 which may include both voice and data transmissions. On the right side of FIG. 1 is a preferred wireless mesh where each node 104 has three radios, two for communicating with other mesh nodes via backhaul links 105, 106, 107, and 108 and a service radio (AP radio) for communicating with client devices 109 which may include transmissions for voice, data, or both.

For the 1-radio mesh, all of the backhaul links 102 are on the same channel (frequency) and are therefore contending in the same spectrum. Since the backhaul function is performed by the same radios that service clients, there is contention between all clients and all backhaul links whenever devices and mesh APs are within range of one another. For VoIP transmissions, this situation creates the largest amount of latency and jitter since voice packets must contend again and again with voice packets in other service sets (at other mesh relay nodes) as they are relayed through the backhaul path, thereby compounding the contention and increasing latency/jitter along the way. In contrast to this, the preferred mesh with a multi-radio backhaul path uses different channels (frequencies) for different backhaul links. Thus, links 105, 106, 107, and 108 would all be on different channels and therefore are not contending with each other. Note that these backhaul links also use separate radios form the radios that service clients 109, and therefore client service transmissions do not contend with backhaul transmissions.

Figure 2:
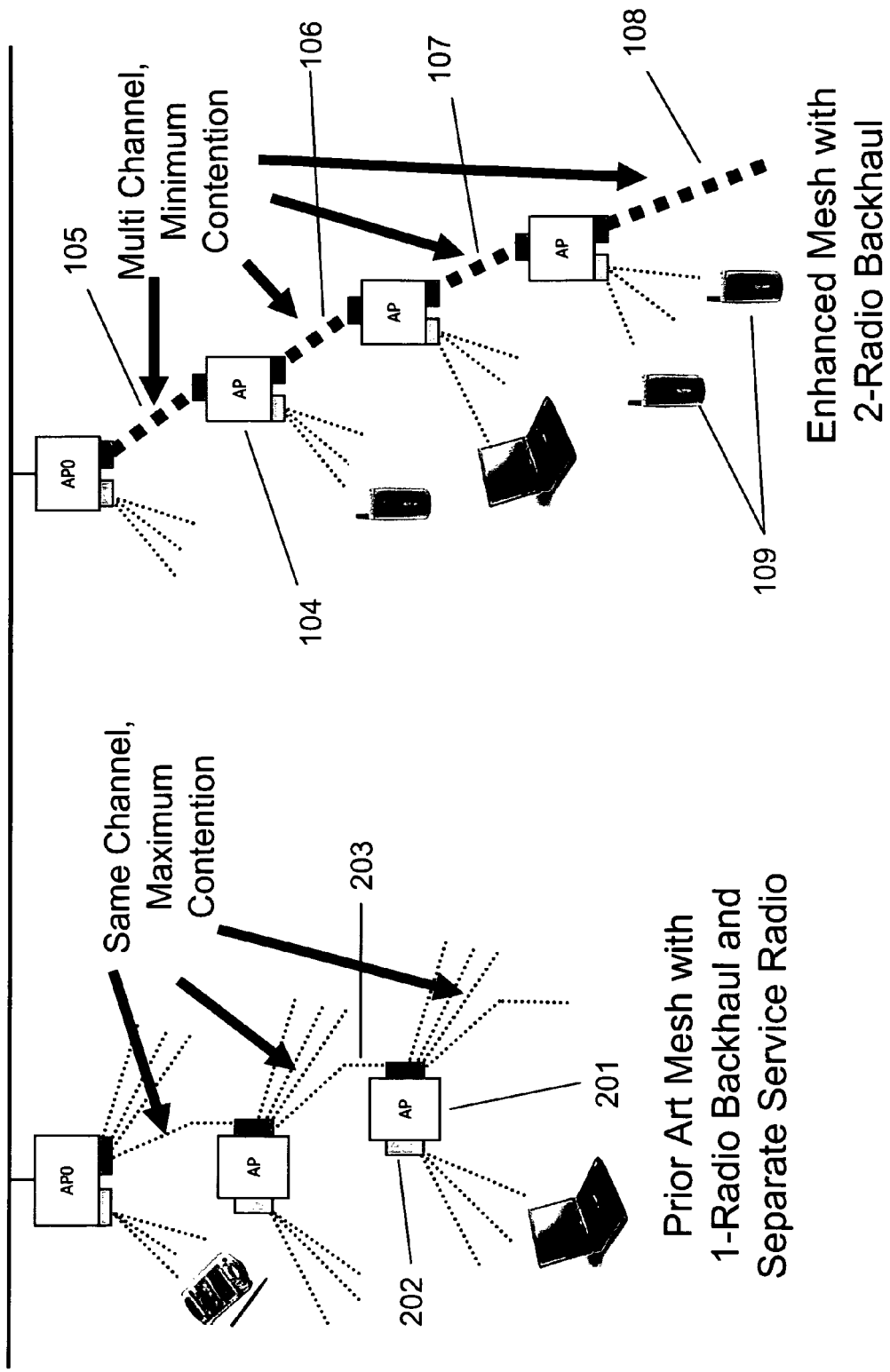
FIG. 2 illustrates the contention on a conventional "1+1" radio mesh compared with a mesh having a 2-radio backhaul path.

FIG. 2 shows the preferred mesh with a 2-radio backhaul compared with a recent evolution of the 1-radio mesh. Notice in FIG. 2 that each node 201 does have 2-radios, but that one of these radios 202 has been dedicated to servicing clients while the other is dedicated to the backhaul link 203. Hence this architecture is called a "1+1" mesh since the backhaul path still uses only one radio. The result is that while transmissions between clients and mesh nodes no longer contend with backhaul traffic, backhaul links still contend with each other.

Figure 3:
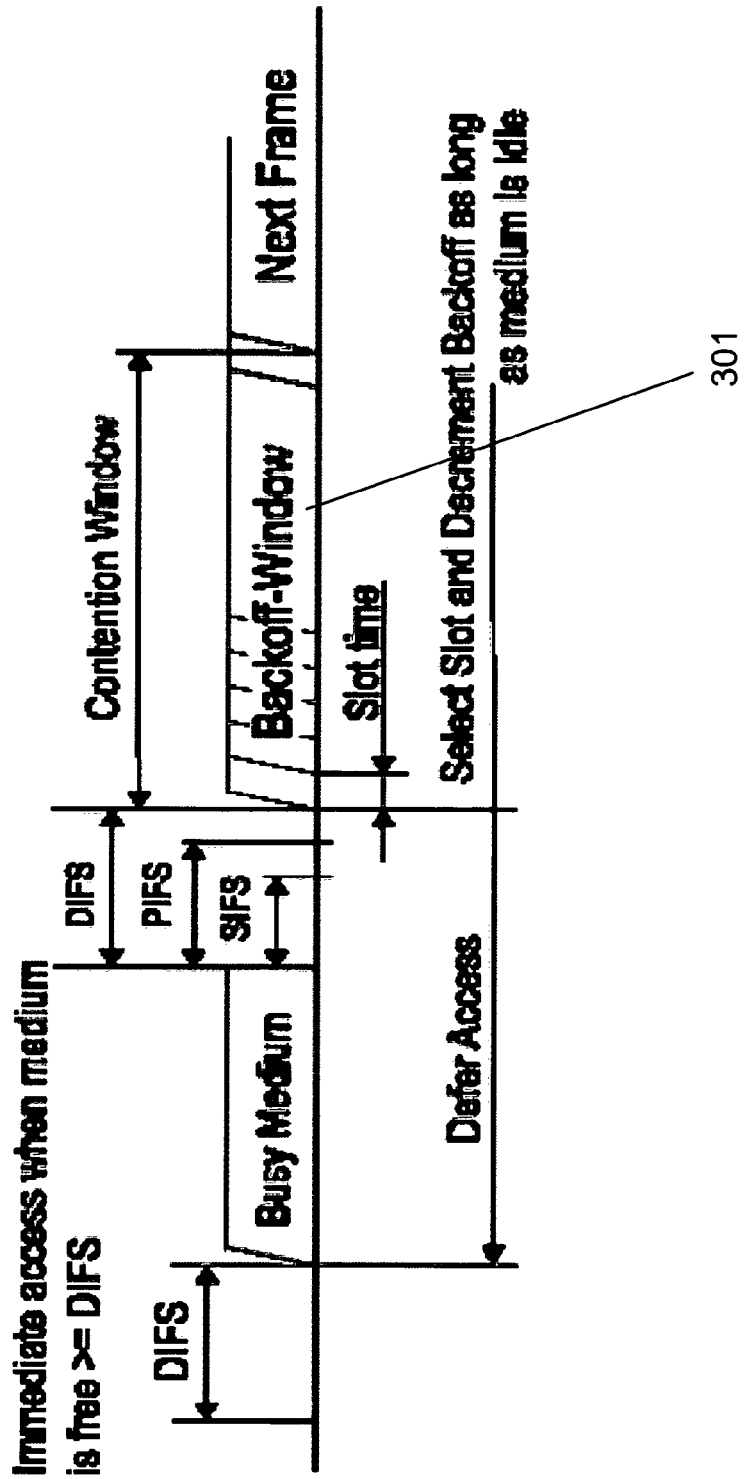
FIG. 3 graphically illustrates the parameters governing the contention arbitration mechanism of the standard 802.11 wireless communications protocol.

In all of these examples, even the preferred mesh with 2-radio backhaul, transmissions from multiple clients to any one mesh node still contend with each other. The basic contention arbitration mechanism for the 802.11 protocol is well known in the art and is shown graphically in FIG. 3. Notice here that in the contention window there is a backoff window 301 governed by a random number scheme. In other words, when multiple clients wish to transmit to the same AP simultaneously, their transmissions collide and they all wait their turn according to a time increment corresponding to a random number. This means that a particular client-to-AP link may transmit quickly for some packets and may have considerable delay (latency) for other packets. The difference between the minimum and maximum delay is the jitter that results. Voice transmission are especially demanding regarding latency and jitter as voice quality quickly degrades if new packets are not received within successive 20 mS time increments.

Figure 4:
FIG. 4 graphically illustrates the inefficiency of VoIP packets in the 802.11 wireless medium, by comparing with a standard data packet.

The only way to eliminate this latency and jitter is to synchronize the transmissions between the clients and AP. The methods that will be described in this application also take advantage of another characteristic of voice transmissions, their inefficiency. FIG. 4 illustrates the relative inefficiency of voice packets when compared with data packets. In a standard data packet of 1500 bytes, the transmission time for data information 401 is 1.04 mS and the overhead 402 of the 802.11 protocol is 0.4 mS. Now, compare this to data information 403 contained in a voice packet produced by a G.711 codec (64 Kbps). Here, the overhead is now greater than the voice data information. Even more pronounced is the contrast with voice information 404 contained in a voice packet produced by a G.729 codec (8 Kbps) where the overhead (0.4 mS) now dwarfs the voice information (0.06 mS). Thus, it is advantageous to consolidate multiple VoIP packets into a single new packet so that the overhead of the wireless protocol can be shared by many smaller packets. This is shown at the bottom of FIG. 4 where multiple VoIP data elements 405 are concatenated into a single packet and therefore share overhead 402 thereby greatly increasing the overall efficiency of transmission.

This inefficiency previously led to the concatenation (consolidation) scheme described in previous application Ser. No. 11/084,330 where voice packets were concatenated for transmission along the mesh backhaul path. Now, this method will be further utilized to enable more efficient communication between voice clients (voice devices) and APs in addition to efficient communication along the mesh backhaul path. First, to establish a specific terminology for the description to follow, FIG. 5 describes the definitions of a packet 501, a container 502 and a shipment 503. A packet is the basic element to be transmitted and multiple packets can be concatenated to form Containers 502 which may be as large as the maximum allowed packet size, typically 2300 bytes for the 802.11 wireless protocol. If there are more client transmissions that one container can hold, then multiple containers will be used to form a shipment 503.

Figure 6:
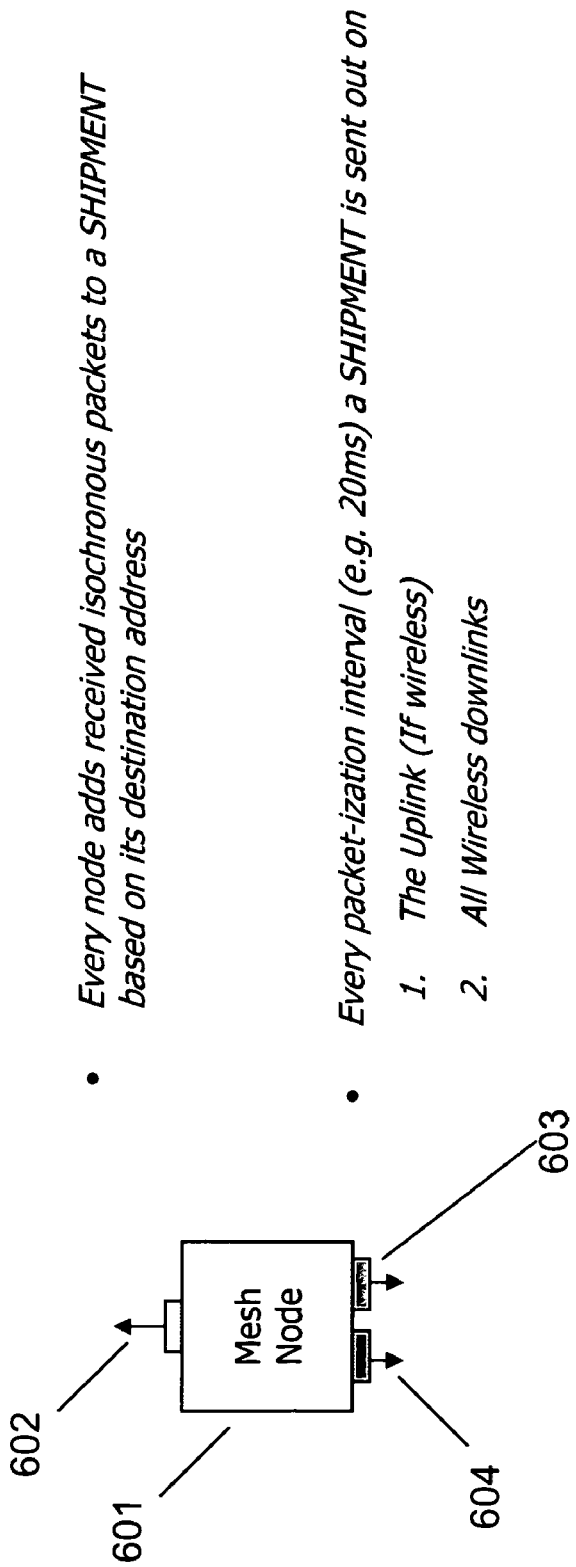
FIG. 6 describes specific scenarios for the concatenation and transmission of concatenated packets.

Referring back to FIG. 1, and now with the added effect of concatenated containers and shipments being sent up and down the mesh backhaul path along links 105, 106, 107, and 108, the addition of packets to containers and shipments is described in FIG. 6. When a voice client sends a VoIP packet to mesh node 601 it is received on service (AP) radio 604. Then, if it is desired to add this packet to a container or shipment, it is added before the completion of the current 20 mS interval and the container or shipment leaves at the end of the interval. Since the container may contain packets intended for destinations in the overall mesh tree both above and below the origination node, the container is sent out on both the uplink radio 602 and the downlink radio 603.

Figure 7:
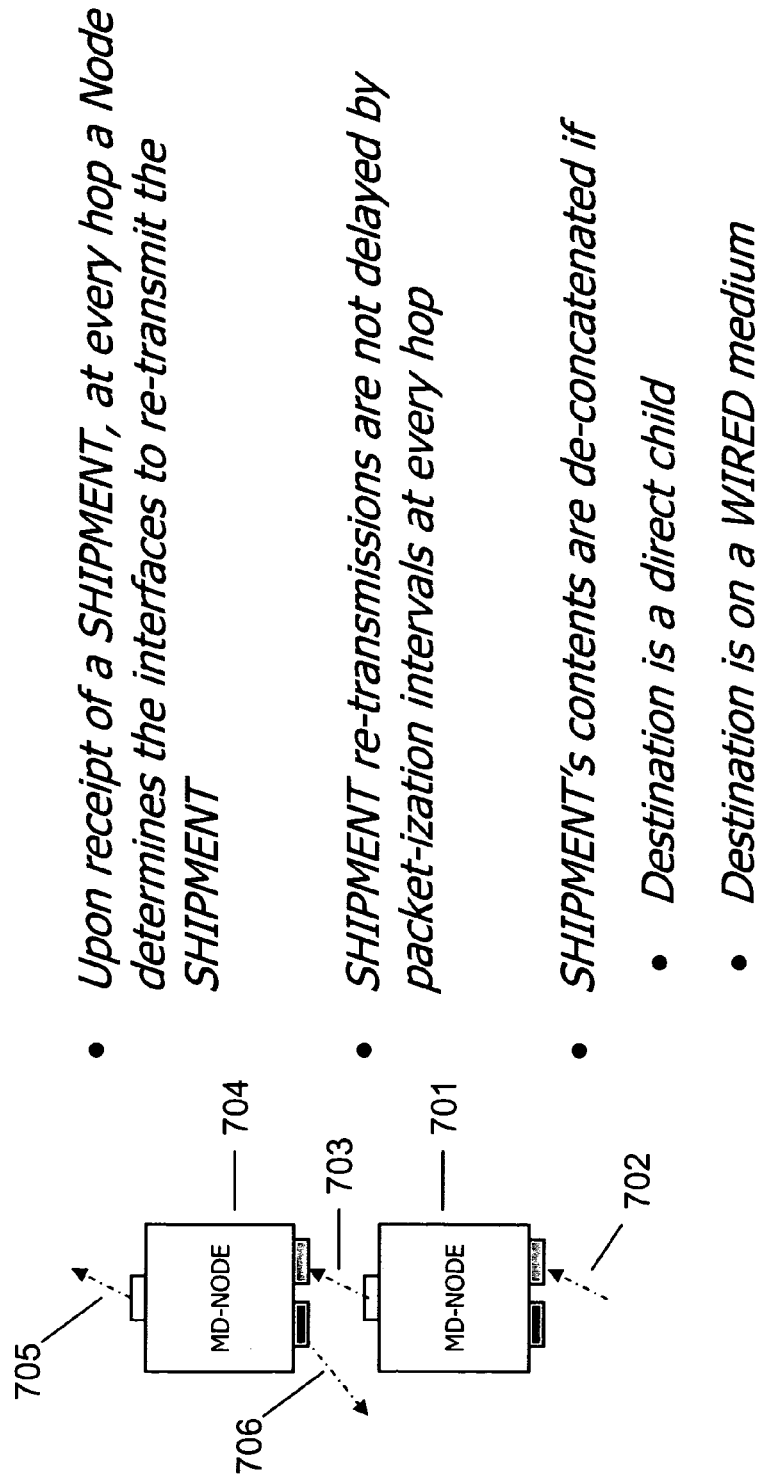
FIG. 7 illustrates specific instances in the transmission of concatenated packets through the mesh where re-transmission or de-concatenation will occur.

When a mesh node such as 701 in FIG. 7 receives a container or shipment on backhaul link 702, the container will be passed along via backhaul link 703 to mesh node 704. If a container has a packet where the destination is a direct child of the node 704, the container will be de-concatenated by the processor within node 704 and the packet(s) will be sent via service radio 706 to their destination. Containers received by node 704 on link 703 will also be relayed up the tree via backhaul link 705 unless node 704 is a root node which connects to a wired network. In that case, all packets in the container will be de-concatenated and sent along the wired network.

Figure 8:
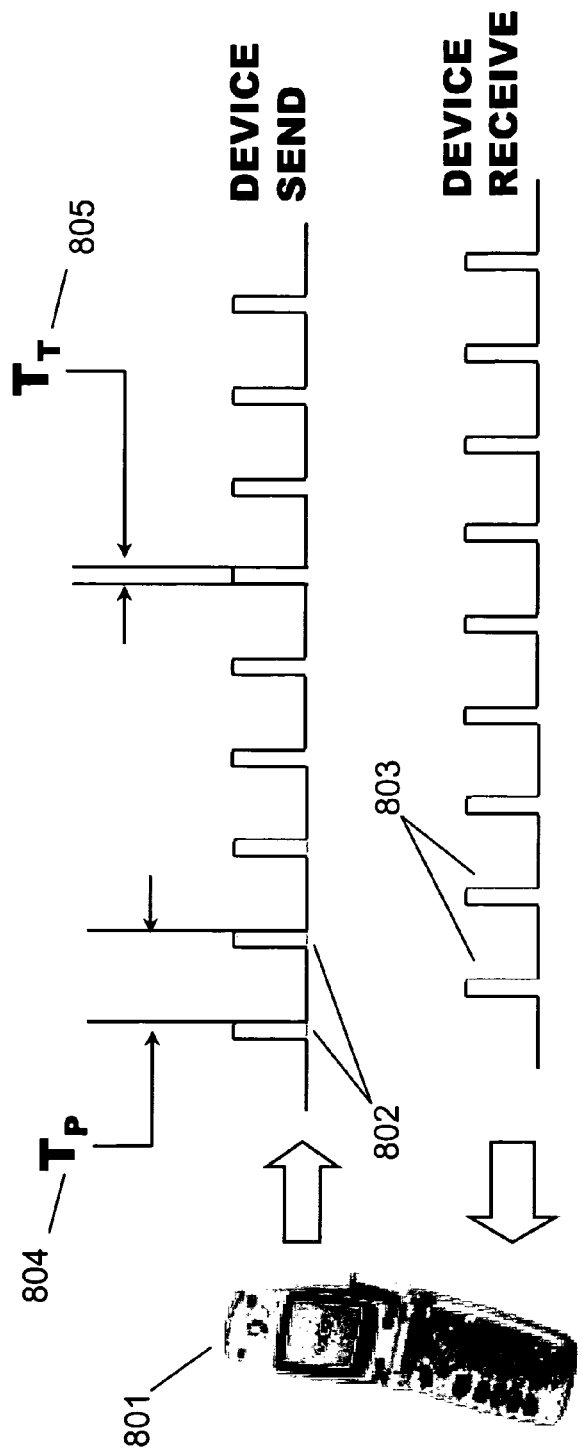
FIG. 8 illustrates how a single voice device would communicate with the base station to send and receive voice packets at regular intervals.

FIG. 8 simply shows the send an receive transmissions for a typical (prior art) voice device or client 801 as it communicates with an AP. Packets are sent 802 and received 803 at regular 20 mS intervals 804 and there is no synchronization with transmissions from other voice clients. Transmission time 805 is typically 0.4 mS for 802.11a and 0.8 mS for 802.11b.

Figure 9:
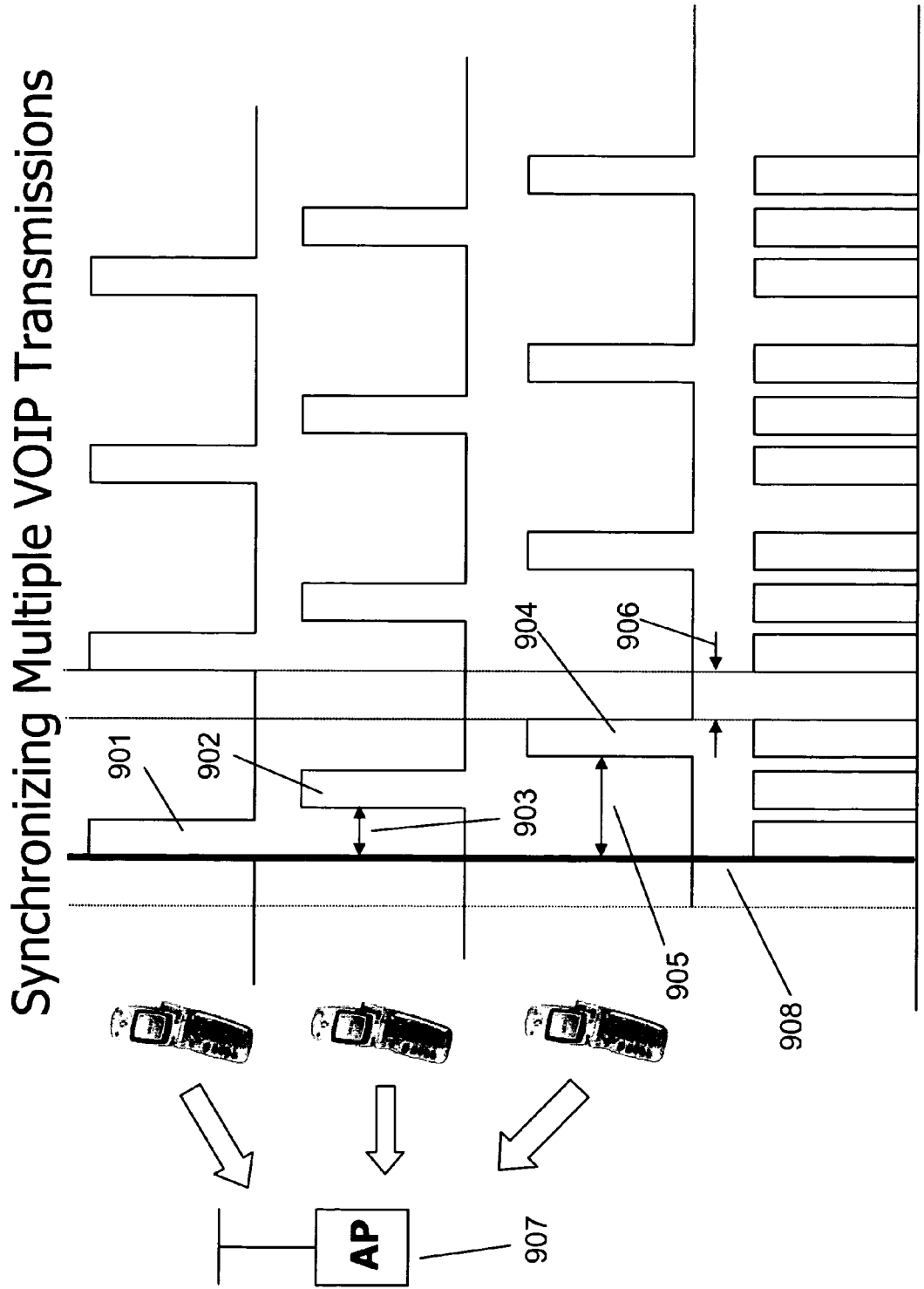
FIG. 9 shows the synchronization of multiple voice devices accessing the same wireless medium (same AP), including individual "send" packets.

FIG. 9 illustrates how the transmissions sent from multiple voice clients to an AP can be synchronized according to this invention such that they do not collide or overlap, thereby avoiding the contention phenomenon that can so easily create the latency and jitter that degrades VoIP conversations.

One way to provide some coordination between the voice devices is to have time slices assigned to them by the AP 907 in FIG. 9. The AP that voice devices talk to will assign the time slices such that all the "send" packets (from the devices to the AP) have a unique time slice with a small guard band to ensure that only one phone is sending packets in its time slice. Each voice "send" is synchronized to beacon 908 such that all voice devices "send" packets are sent back to back—as soon as one voice device transmission ends the next one will begin after the required preamble for the wireless medium access protocol, and given the guardbands shown in FIG. 10. Thus, all voice devices send packets are transmitted one after the other on the medium. For instance, transmission 902 will follow transmission 901 because delay period 903 has defined the time slot for 902. Likewise, transmission 904 follows 902 since delay period 905 is longer still. Note that at the end of this sequence of coordinated transmissions, there is additional time 906 remaining within the 20mS period which can be used for transmissions in the opposite direction according to this invention.

Figure 10:
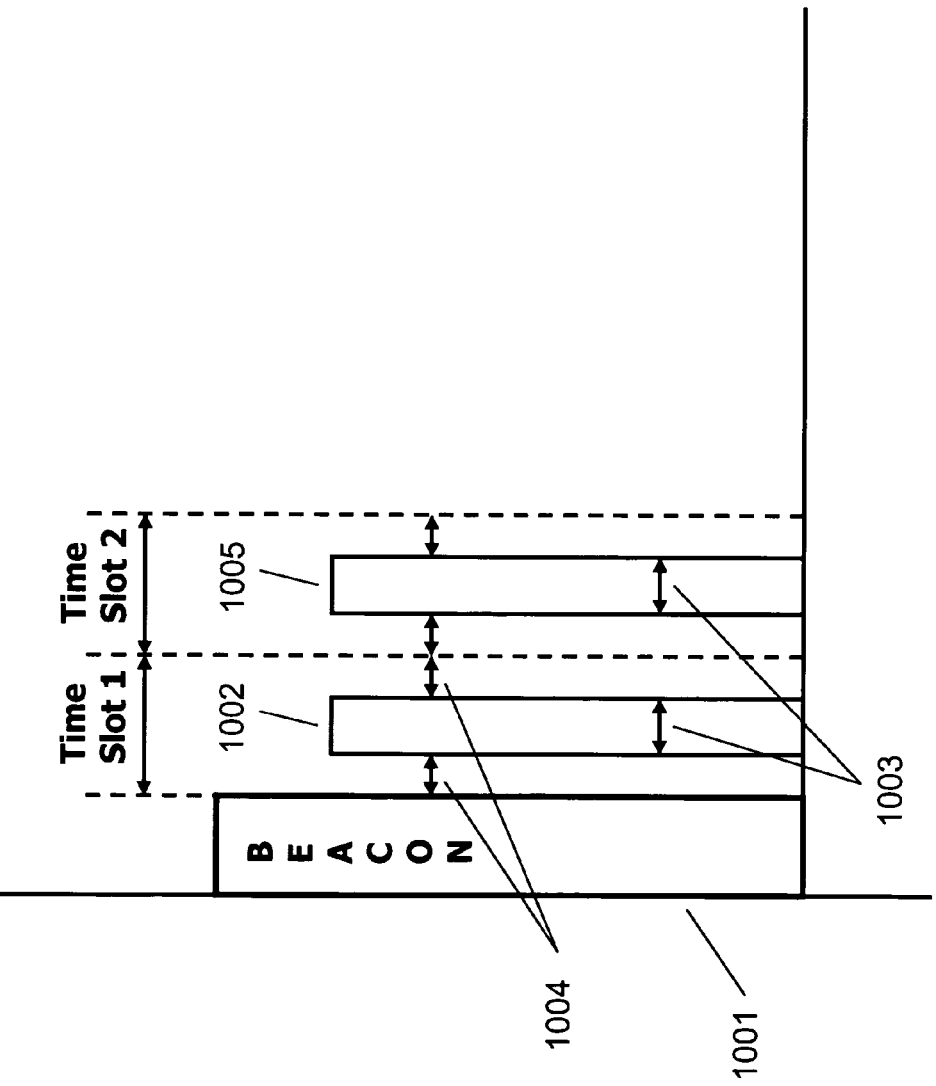
FIG. 10 shows how the beacon is used to synchronize multiple voice transmissions relative to the beacon packet timing position.

The synchronization is accomplished by referencing the send transfers to the AP's beacon packet timing position as shown in FIG. 10. The beacon packet 1001 format is well known in the art and can optionally contain information intended to tell client devices specific details for specific applications. Hence, this information field, known as the ASIE (Application Specific Information Element) can be used to assign time slot information to individual voice client devices. Alternately, the AP can send a command packet to each voice client telling it the specific information for its particular time slot. Either way, the first voice client will respond by sending its voice packets in "Time Slot 1" as shown in FIG. 10 where its transmission will have duration 1003 (typically about 0.5 mS) with a guardband of time 1004 (typically about 0.2 mS) both before and after its transmission. A second voice client 1005, if present, will be assigned the next time slot, and so on until all voice clients within range of the particular AP are synchronized for their VoIP packet transmission.

Note that various techniques for beacon synchronization are possible including those described in U.S. application Ser. No. 11/036,297 filed Jan. 7, 2005 which is herein incorporated by reference. This referenced application describes methods for synchronization and beacon alignment relating mostly to the 802.15.3 standard, but some of which are applicable to the current invention.

While the methods described in this application for synchronization appear to create a form of TDMA (Time Division Multiple Access) method, it should be understood that the underlying 802.11 protocol functionality is still in effect and the contention arbitration scheme (CSMA/CA—Carrier Sense, Multiple Access/Collision Avoidance) for 802.11 is still in effect. Essentially, the methods according to this invention provide a pseudo TDMA scheme that is superimposed over the standard protocol. After the coordination is set up, the devices do not contend with each other since each has a separate time slice allocation. The CSMA/CA contention window for a single active device is small: latency and jitter is controlled. TDMA-like functionality is provided for voice traffic within a CSMA framework normally used for data transmissions.

Figure 11:
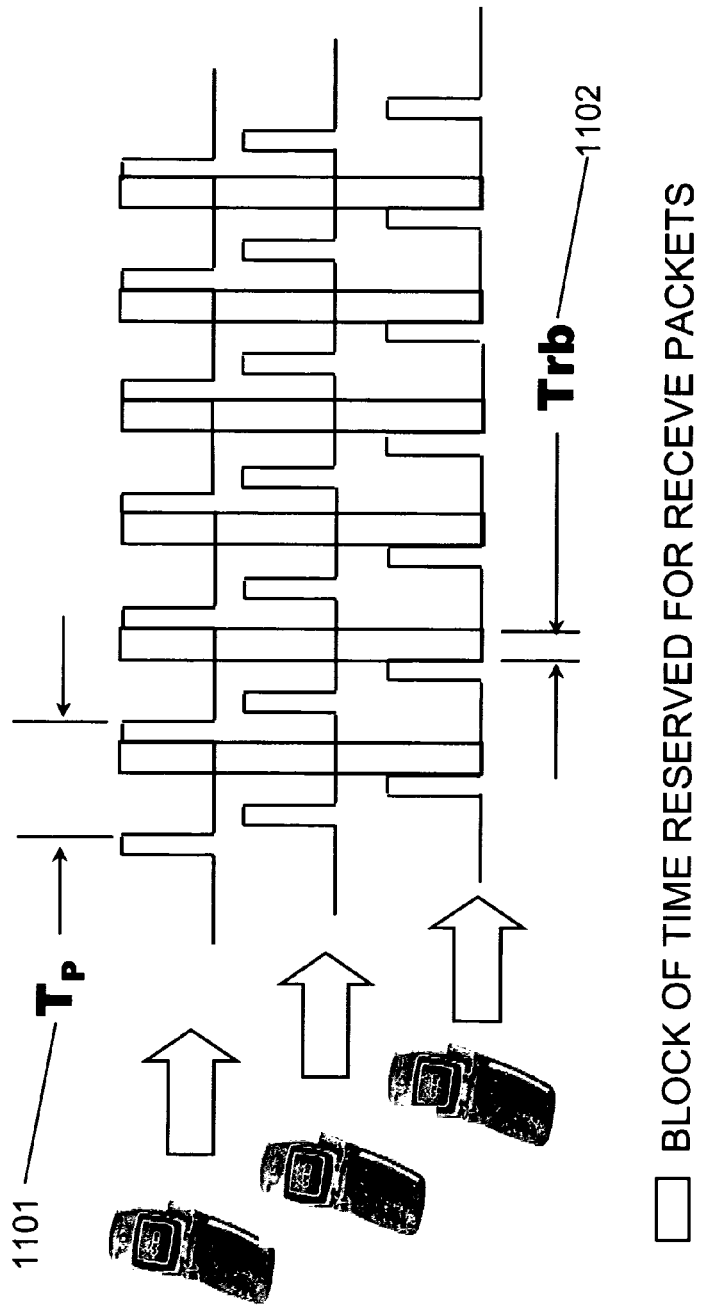
FIG. 11 shows the synchronization of multiple voice devices accessing the same wireless medium with a focus on the time for "bulk receive" packets that are shared among the separate devices.

FIG. 11 shows the interleaved packetization times 1101 for multiple synchronized voice devices sending packets to an AP. Additional time 1102 shown in FIG. 11 is key to the present invention for it leaves a block of time (within the 20 mS interval) to take care of transmitting all packets sent from the AP to the voice devices. Note in FIG. 11 that "receive block" 1102 is shown as one contiguous block as opposed to individual time slices for each voice device. That is because it is actually one large container packet. There are efficiencies resulting from lumping together all receive packets into one larger packet and transmitting that container packet. A container packet—containing individual packets to be received by individual voice devices—uses less airtime than when transmitting individual packets for each voice device separately. It is also compatible with the VoIP concatenation method described earlier in this application and in previously referenced applications.

Software on the client side—on the voice device—can then extract the appropriate packet from the container, based on a packet identifier. This concatenation of client packets from the AP thus enables more transmissions in the same time interval, enabling more VoIP conversations to be handled within the 20 mS interval while virtually eliminating jitter.

Figure 12:
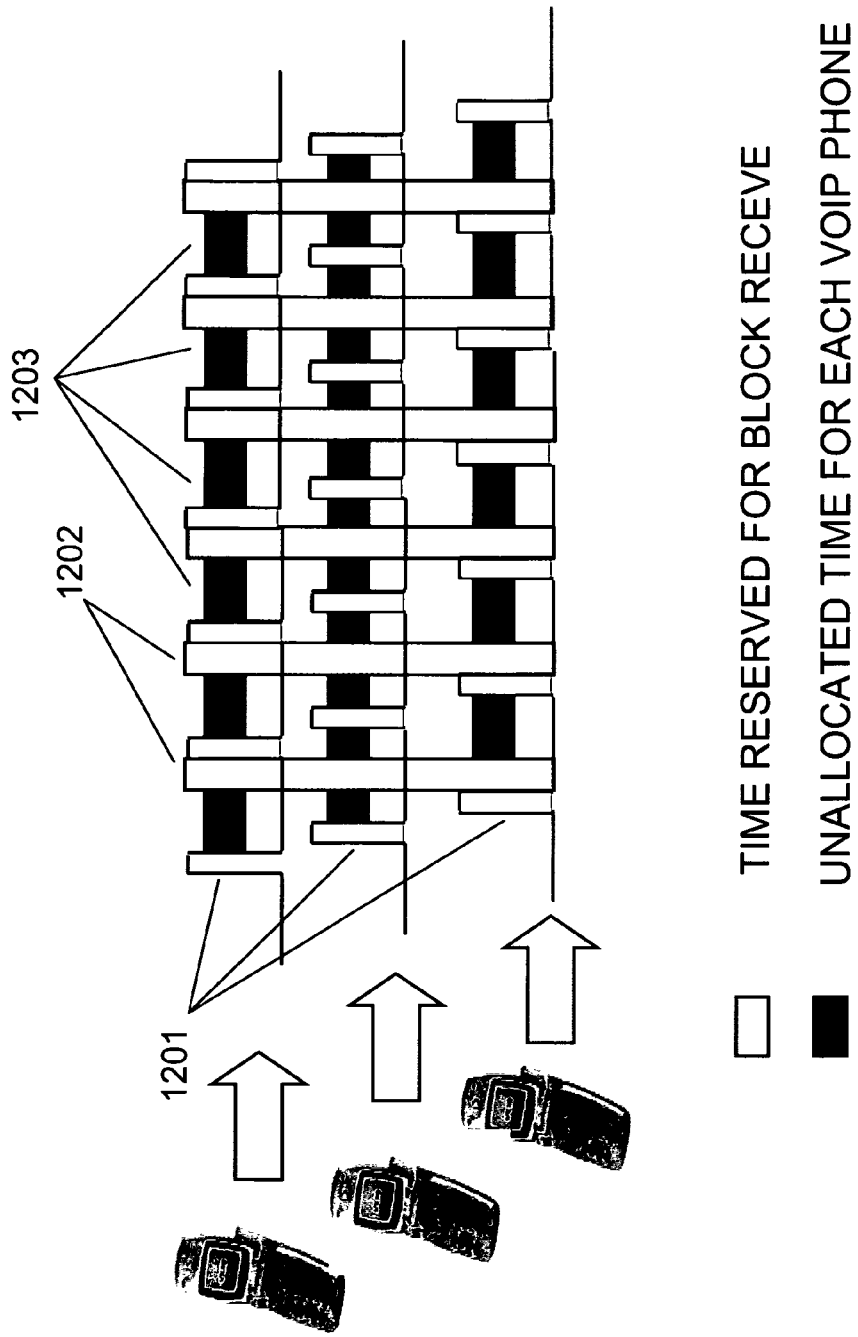
FIG. 12 shows that for each voice device there are unused time intervals that could be used for other purposes, eg listening for other access points to connect to and/or sending and receiving on another channel.

FIG. 12 shows that for each voice device, in addition to the time allocated for the send packet 1201 and the block receive packet 1202, there are unused time intervals 1203 that are available to perform other functions. This unused or unallocated time can be used for either listening—scanning for other access points to connect to, and/or for both sending and receiving on another channel to/from another AP radio. For example, the same radio could switch to another channel intended for data transmissions. Label 1203 shows the unused time interval for one of the three voice devices shown in the figure. Notice that the unused time intervals may not have a consistent duration.

Note that there other variations on this theme that are possible. For instance, since the block receive 1202 is always sent at a specific point in time, the block receive could actually be sent to the voice clients by a different AP on a different channel.

Figure 13:
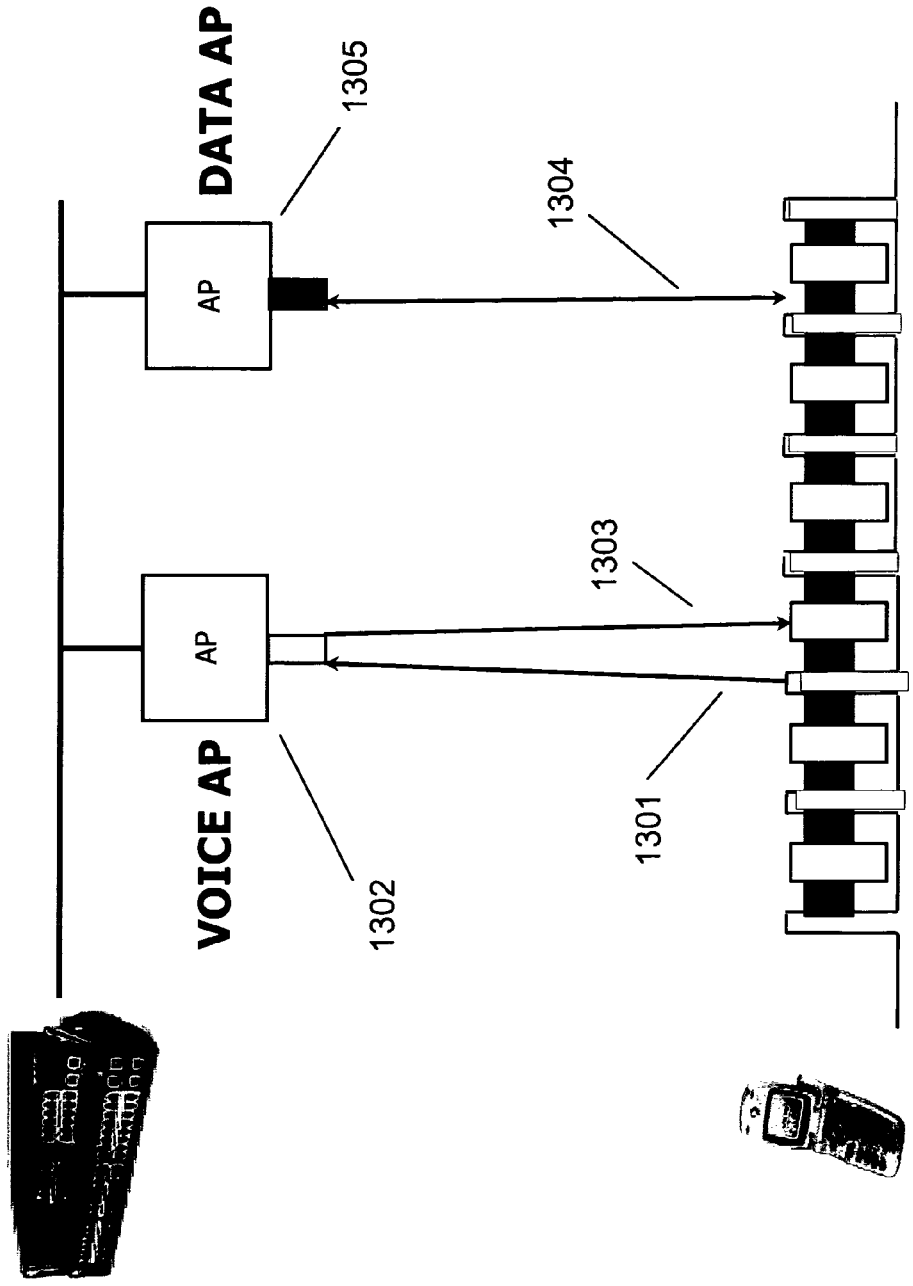
FIG. 13 shows the three modes of communication that can occur between voice devices and associated Access Points.

FIG. 13 shows a system configuration where two AP radios (one voice AP 1302 and one data AP 1305) are used to take advantage of unused time interval 1203 in FIG. 12. Here, FIG. 13 illustrates three modes of communication that a specific voice device and associated AP can have according to this invention. First, individual send packets 1301 are transmitted from a voice device to voice AP 1302. Second, block receive packet 1303 is transmitted from voice AP 1302 to all voice devices with each specific voice device retrieving its appropriate packet and discarding the rest. Last, a voice client device may use the unused or unallocated time interval 1203 to associate with the data AP for data transmissions under normal CSMA/CA, the standard rules for arbitration on 802.11. In other words, while voice communications 1301 and 1303 are made within specific time slots prescribed by voice AP 1302, communications with the separate data AP 1305 can occur in any period of unallocated time for that specific voice device. From the perspective of data AP 1305, the voice device attempting to transfer data information to it is just another device following a normal contention arbitration scheme. Note that many of today's voice capable devices are capable of handling non-voice information such as email, web browsing, and images. Therefore, the ability to transfer this data information without compromising the synchronized voice method described herein is highly valuable.

FIG. 14 shows a voice device 1401 talking to both voice radio 1402 and data radio 1403 on a dual radio Access Point 1404. The Dual radio AP 1404 supports both voice and data functionality integrated within the same unit. There are several advantages to placing both radios in the same unit. The voice device 1401 can associate with both AP radios, each operating on a different channel. During the times allocated for voice, it will switch to the voice radio channel and follow the synchronization method described herein. During the "free" or unallocated time 1203 (time not allocated for voice) it will switch over to the data channel. If the same Access Point software controls both radios then when the voice device makes an association, both types of transmissions can be managed at the same time.

Figure 15:
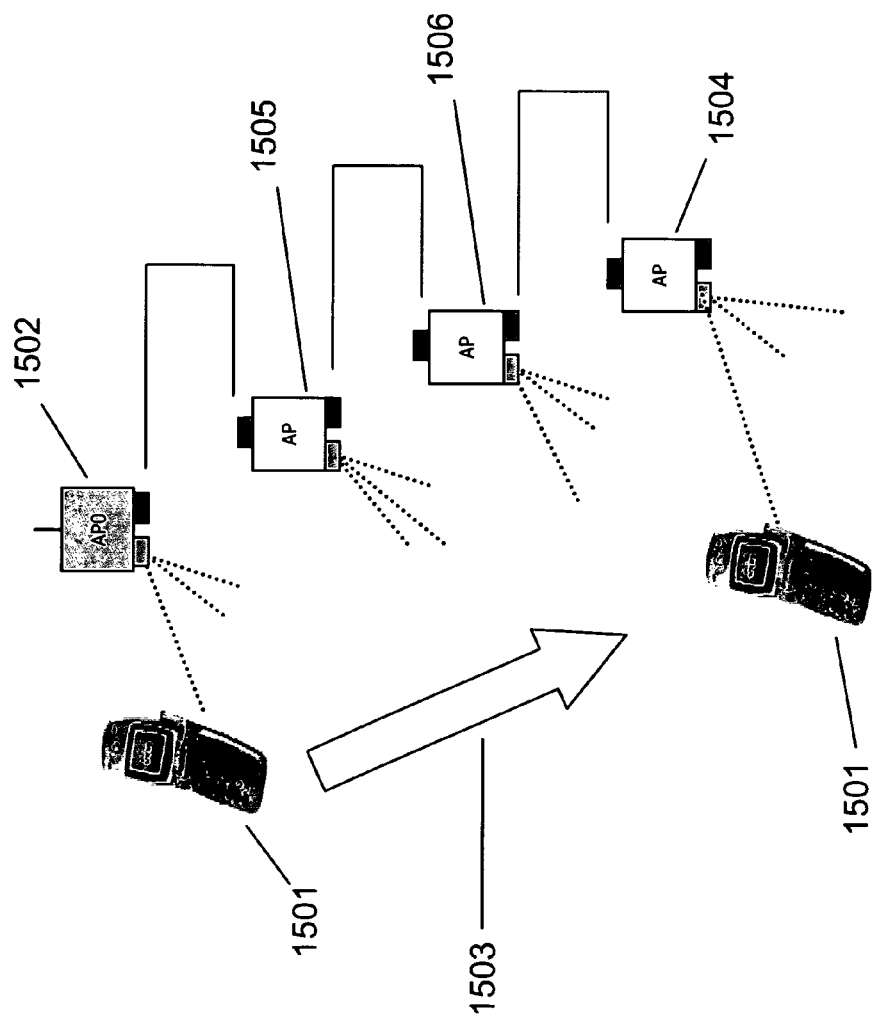
FIG. 15 shows how a voice device can use unallocated time according to this invention to listen for a new AP to connect to while that voice device is roaming (moving).

FIG. 15 describes the scenario where a voice client roams (moves) such that its current connection with one AP gradually becomes weaker and, because of degraded bit rates and/or the potential loss of the signal altogether, it would be prudent for the client to change its connection to an alternative AP offering a connection with higher signal strength. Since the alternative APs may be communicating with voice clients on different channels, it may be necessary for the client to disengage from its current AP, at least temporarily, in order to scan other frequencies and find the channel belonging to the AP which is its most appropriate new connection. Normally, a client, especially a voice client, cannot do this without disrupting or destroying its current conversation. However using the methods discussed herein, the client can use unallocated time 1203 to scan other possible channels and thereby locate an alternative AP which may have a greater signal strength than its current connection and will therefore be its new desired connection.

Thus, voice client device 1501 currently connected to AP 1502 is moving in a direction 1503 where it will soon wish to disengage with AP 1502 and create a new connection with alternative AP 1504. As mentioned in the previous paragraph, device 1501 will scan for alternative AP connections (if necessary on other channels) during unallocated time 1203 and may notice that the signal strength from AP 1504 is getting stronger and in fact is now better than that to AP 1502. It then needs to communicate this desired change through the wireless mesh network such that the changeover is coordinated. This is accomplished by sending the appropriate request through the mesh by way of the "heartbeat" packet information which is periodically sent from all mesh nodes to all other mesh nodes as described in previous applications to the present inventors incorporated herein by reference. The heartbeat information is then relayed from AP 1502 to AP 1505 to AP 1506, and eventually to AP 1504 who acts at the agreed time to engage with client 1501 such that the changeover can occur. In this manner, it is even possible to establish a "make-before-break" transition such that the probability of a smooth transition is maximized.

Figure 16:
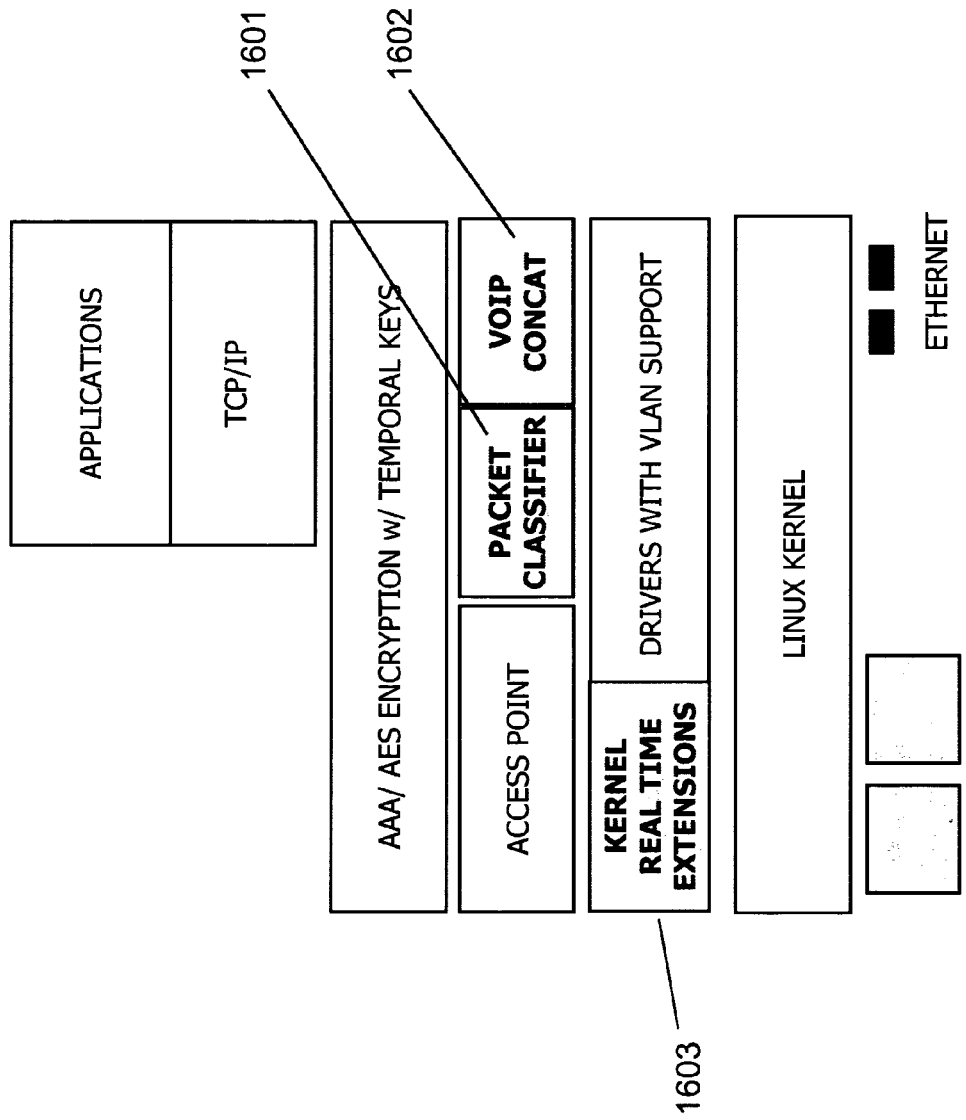
FIG. 16 shows extensions developed and implemented in the network stack to provide more efficient backhaul and service for voice.

The client mobility described in the previous paragraph can very well occur in a city where mesh nodes are installed on street lights or traffic signals. Here, as a client device roams, the connection would be handed-off from one mesh node to another as described in the paragraph above. Since the location of the mesh node is known, unallocated time 1203 can also be used to access a data radio on the currently connected mesh node to retrieve location-specific information to assist in route planning such as:

a) A local electronic map covering the local vicinity
b) Route guidance in conjunction with a local map c) Speed limit information on the current or surrounding streets d) Traffic congestion information on the current or surrounding streets FIG. 16 shows extensions developed and implemented in the network stack to provide an efficient backhaul for voice. The small voice packets are concatenated into larger packets and sent (as one packet) at regular intervals to the client voice devices. Salient portions include the Packet classifier 1601 that recognizes voice packets based on size and regularity of transmissions, the VOIP concatenation engine 1602 that concatenates or "container-izes" small voice packets into a larger "container" packet for more efficient transportation, Real time extensions 1603 to the Linux kernel enable the system to provide near real time performance regarding sending and receiving the latency sensitive VOIP container packets through the network—regardless of what the Operating System is doing at the time.

Note that FIG. 16 is also described in C.I.P. Ser. No. 11/084,330 filed Mar. 17, 2005. In that context it provided a voice container to transport voice packets in bulk up and down the backhaul path of a multiple hop wireless LAN. Here, the same VOIP concatenation engine is also being used to communicate with multiple voice devices associated with an AP radio. The previous patent application focused on the backhaul path, while this application focuses on the client software on voice devices to take advantage of voice concatenation.

Figure 17:
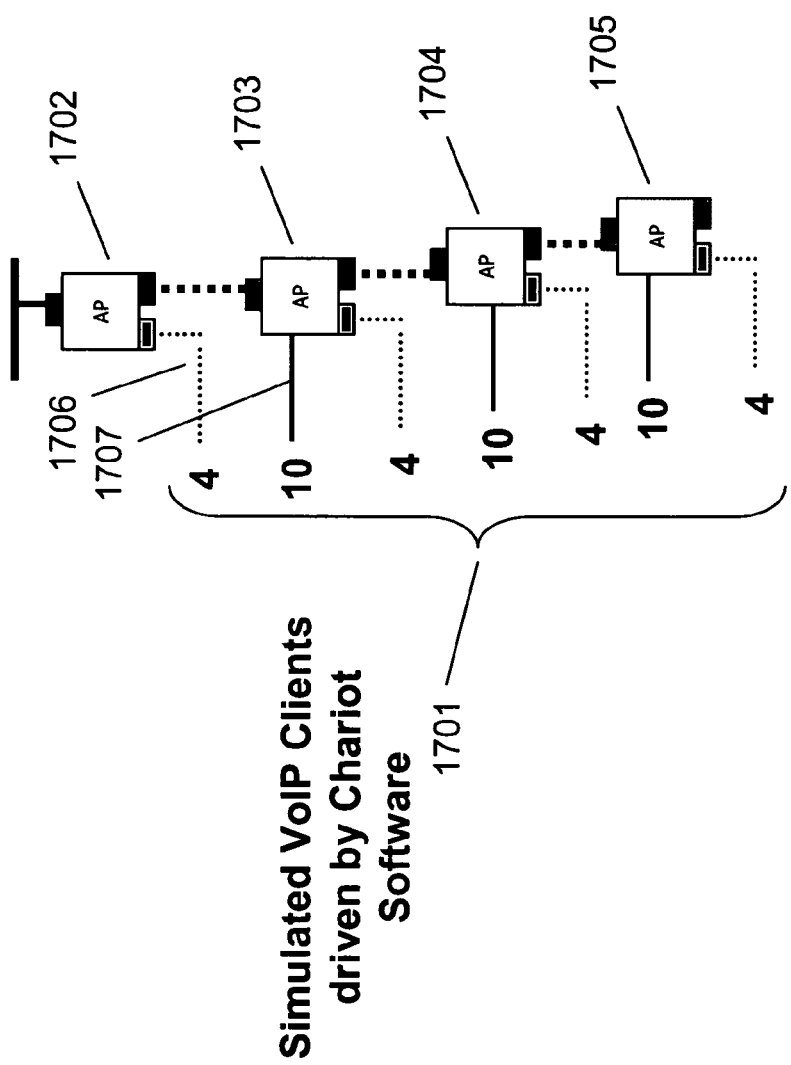
FIG. 17 shows the test setup topology that was used in the lab for the mesh backhaul VoIP concatenation tests.

Tests were performed in the lab to determine the performance of a system that implemented VoIP concatenation along the backhaul of a 4-node wireless mesh network. The system implemented a 2-radio relay according to the preferred mesh architecture described earlier in this application. The VoIP packets were sent via multiple instances of Chariot test software which in total generated 46 simultaneous VoIP conversations 1701 as shown in FIG. 17. Here, each of the mesh nodes 1703, 1704, and 1705 supported a total of 14 client conversations except the root node 1702 which supported 4 conversations on the service radio. The other nodes supported 4 conversations each on their service radio 1706, while the other 10 conversations were supported on the wired Ethernet interface 1707. Since the test was focused on voice packet concatenation on the mesh backhaul, it was not necessary for all conversations to take place via the AP's service radios.

Figure 18:
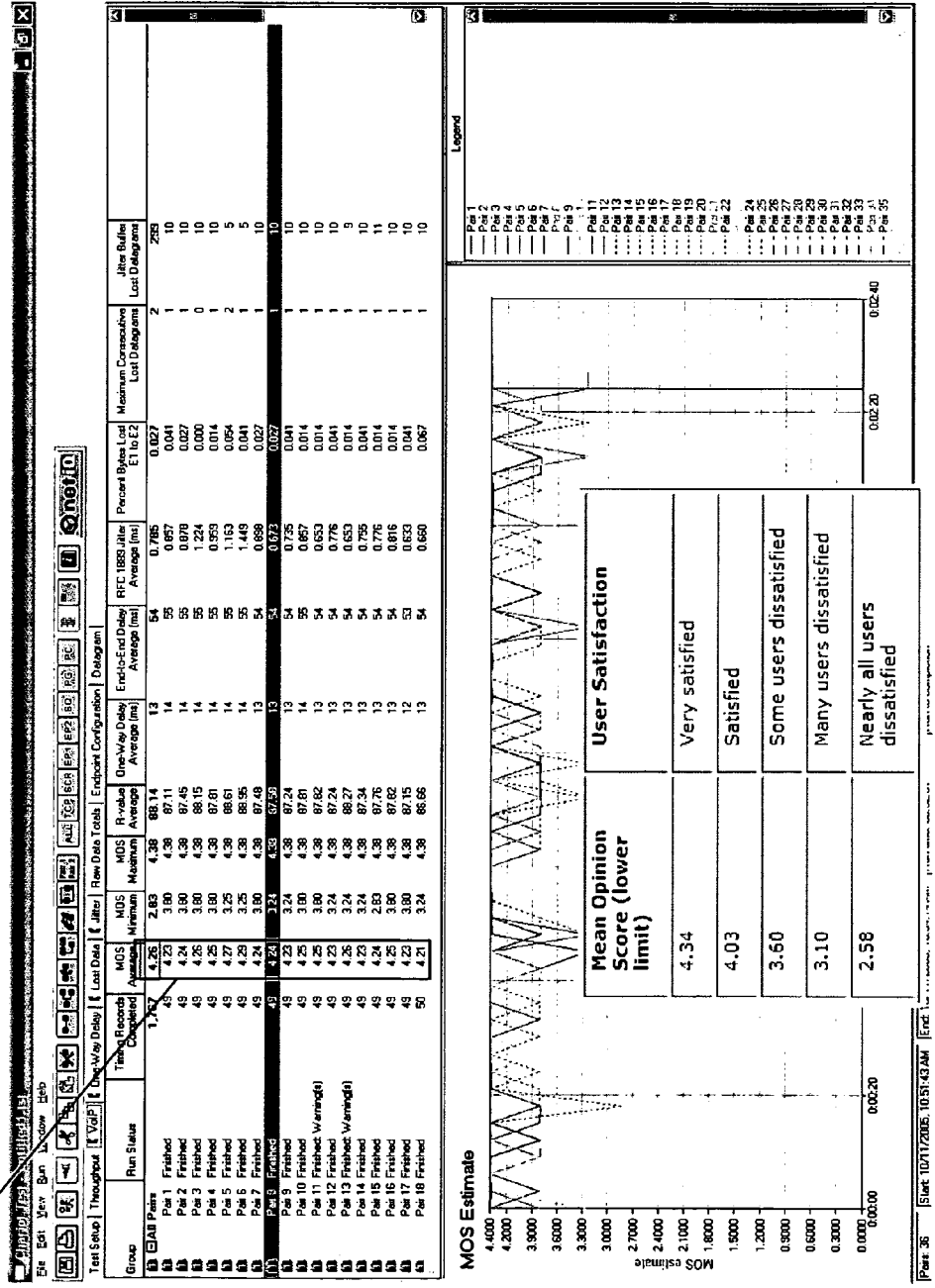
FIG. 18 shows performance results for VoIP concatenation tests on the backhaul of a mesh according to this invention.

FIG. 18 is a printout of the test results for the MOS (Mean Opinion Score), a composite of a number of performance parameters. Here, the score for this test 1801 was 4.26, which rates user satisfaction a between "Satisfied" and "Very Satisfied" on a scale for VoIP conversation quality.

Figure 19:
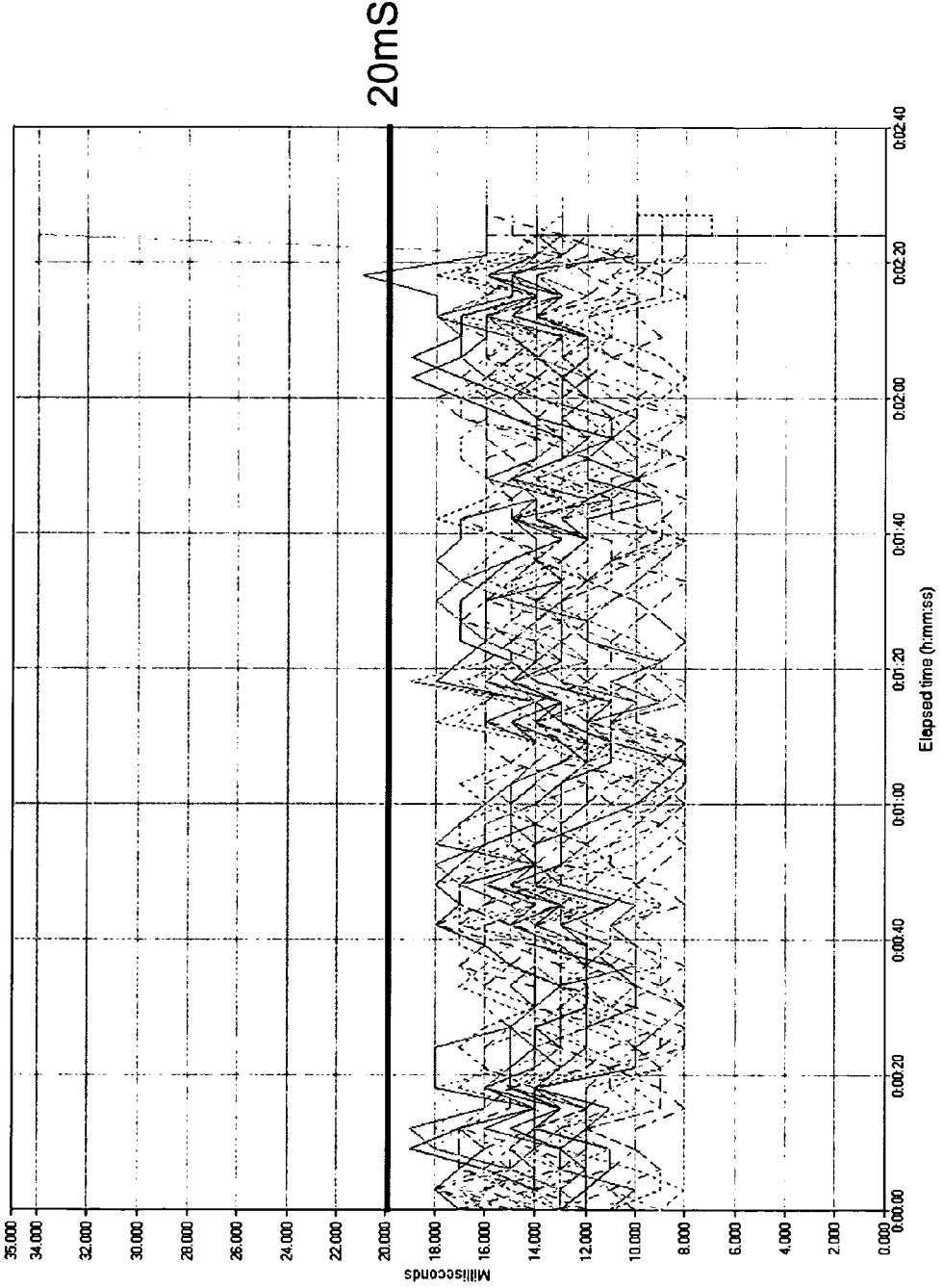
FIG. 19 shows transmission delay results for VoIP concatenation tests on the backhaul of a mesh according to this invention.

FIG. 19 shows transmission delay results for VoIP concatenation tests on the backhaul of a mesh according to this invention. Note that this remains within 20 mS—well within acceptable standards for VoIP.

Figure 20:
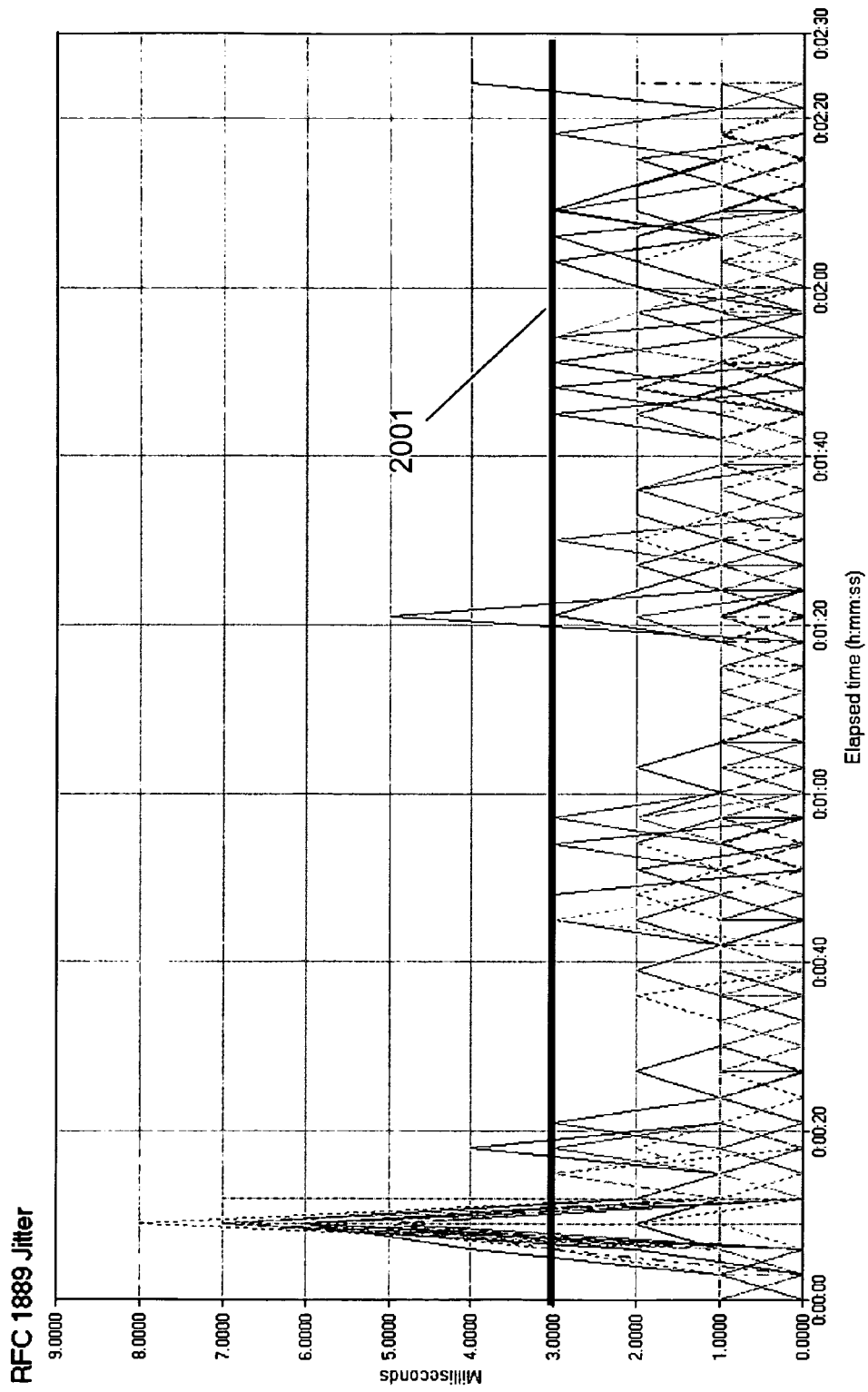
FIG. 20 shows jitter results for VoIP concatenation tests on the backhaul of a mesh according to this invention.

FIG. 20 shows jitter results for VoIP concatenation tests on the backhaul of a mesh according to this invention. Notice that jitter 2001 was normally less than 3 mS, excellent for VoIP.

Figure 21:
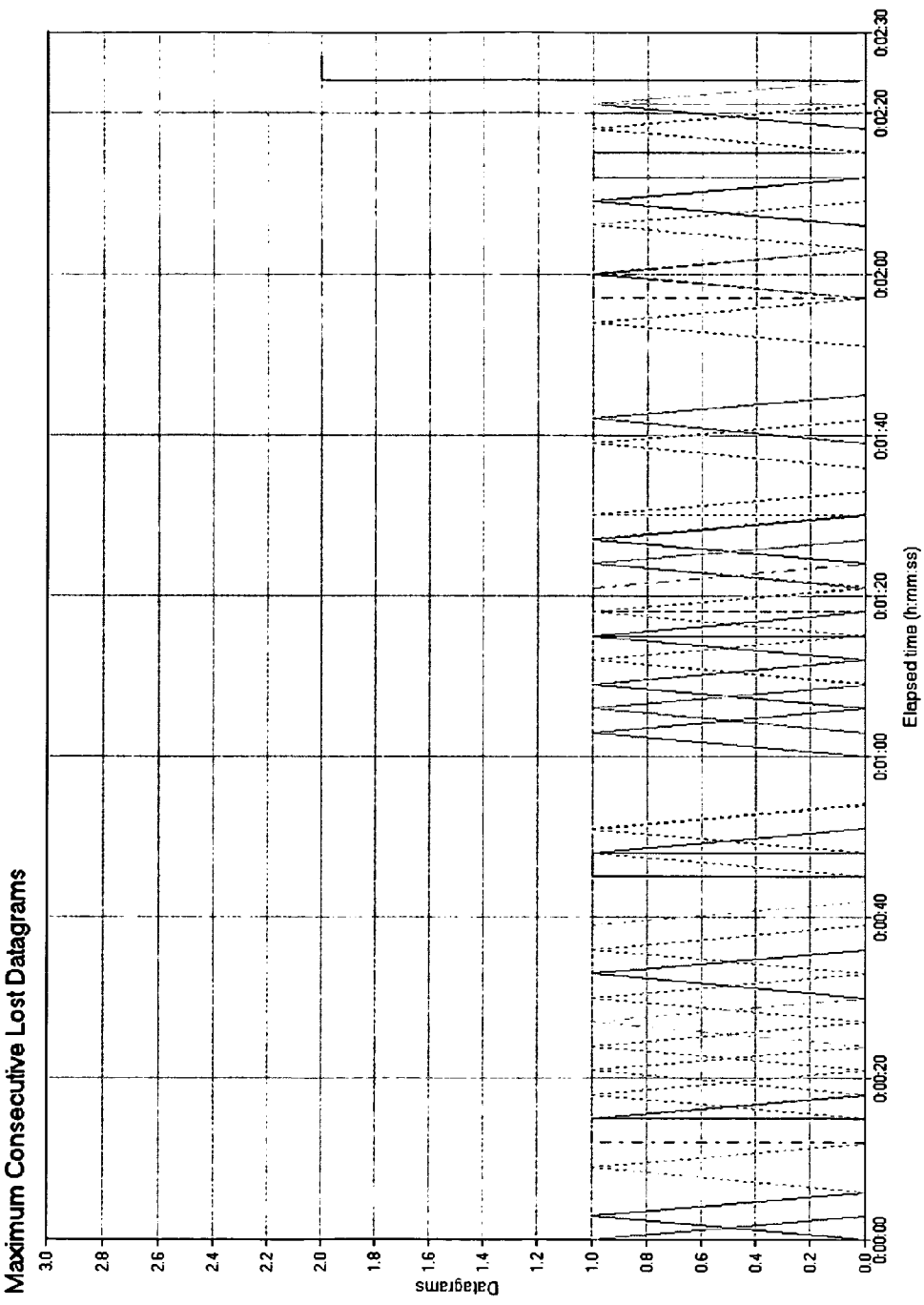
FIG. 21 shows "lost packets" results for VoIP concatenation tests on the backhaul of a mesh according to this invention.

FIG. 21 shows "lost packets" results for VoIP concatenation tests on the backhaul of a mesh according to this invention. This number was consistently less than 1 packet.

Figure 22:
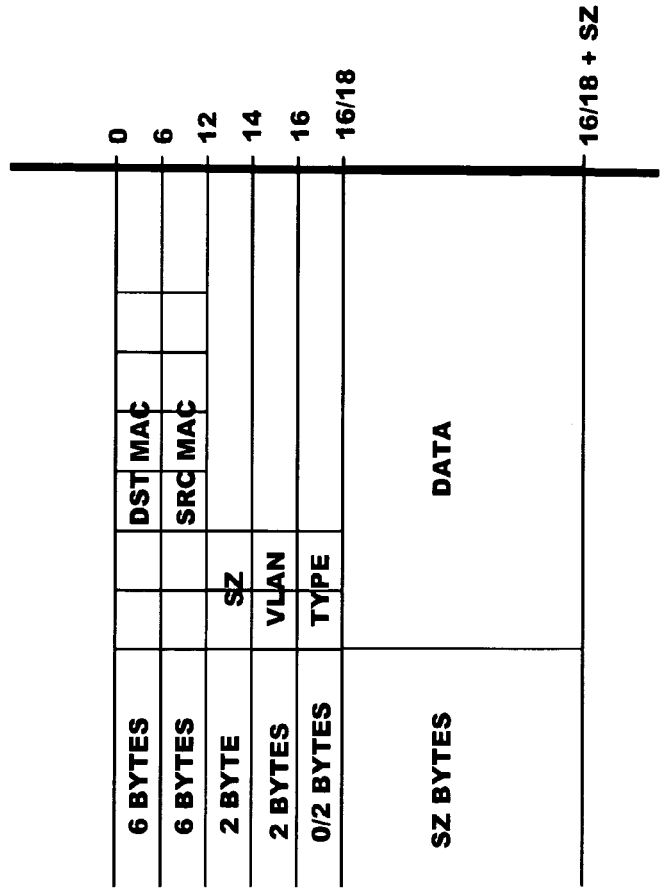
FIG. 22 shows a possible VoIP Concatenation Packet Format according to this invention, where fast computation is the goal.

FIG. 22 shows a possible VoIP Concatenation Packet Format according to this invention, where fast computation is the goal.

Figure 23:
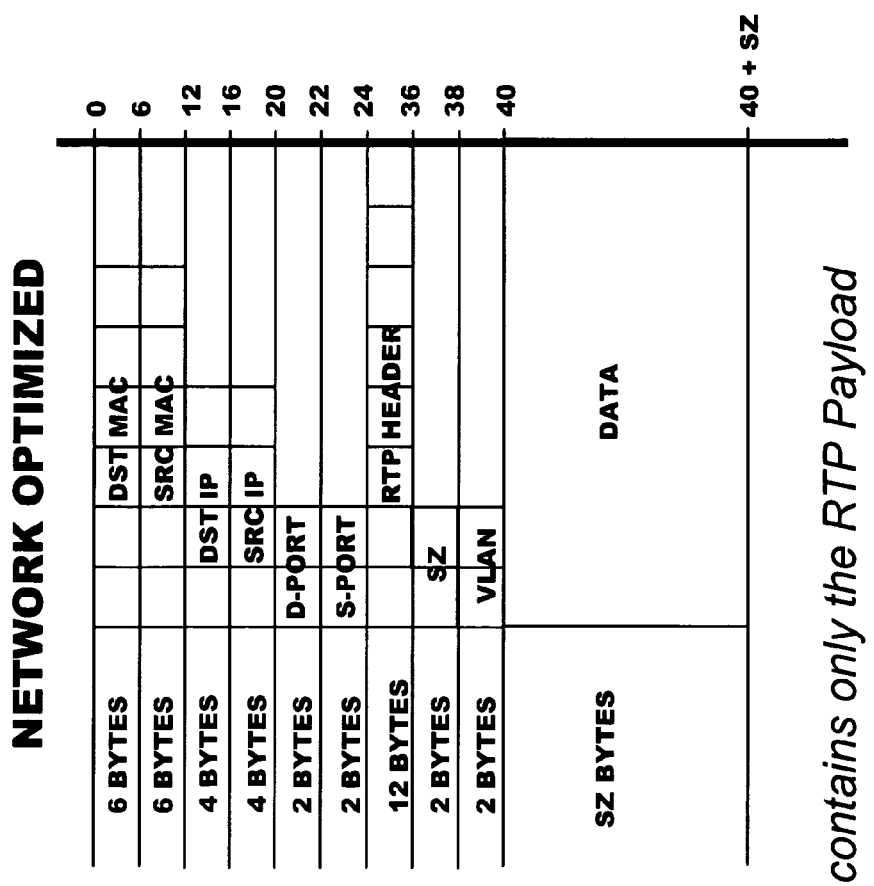
FIG. 23 shows a possible Network Optimized VoIP Concatenation Packet Format according to this invention.

FIG. 23 shows a possible Network Optimized VoIP Concatenation Packet Format according to this invention.

Figure 24:
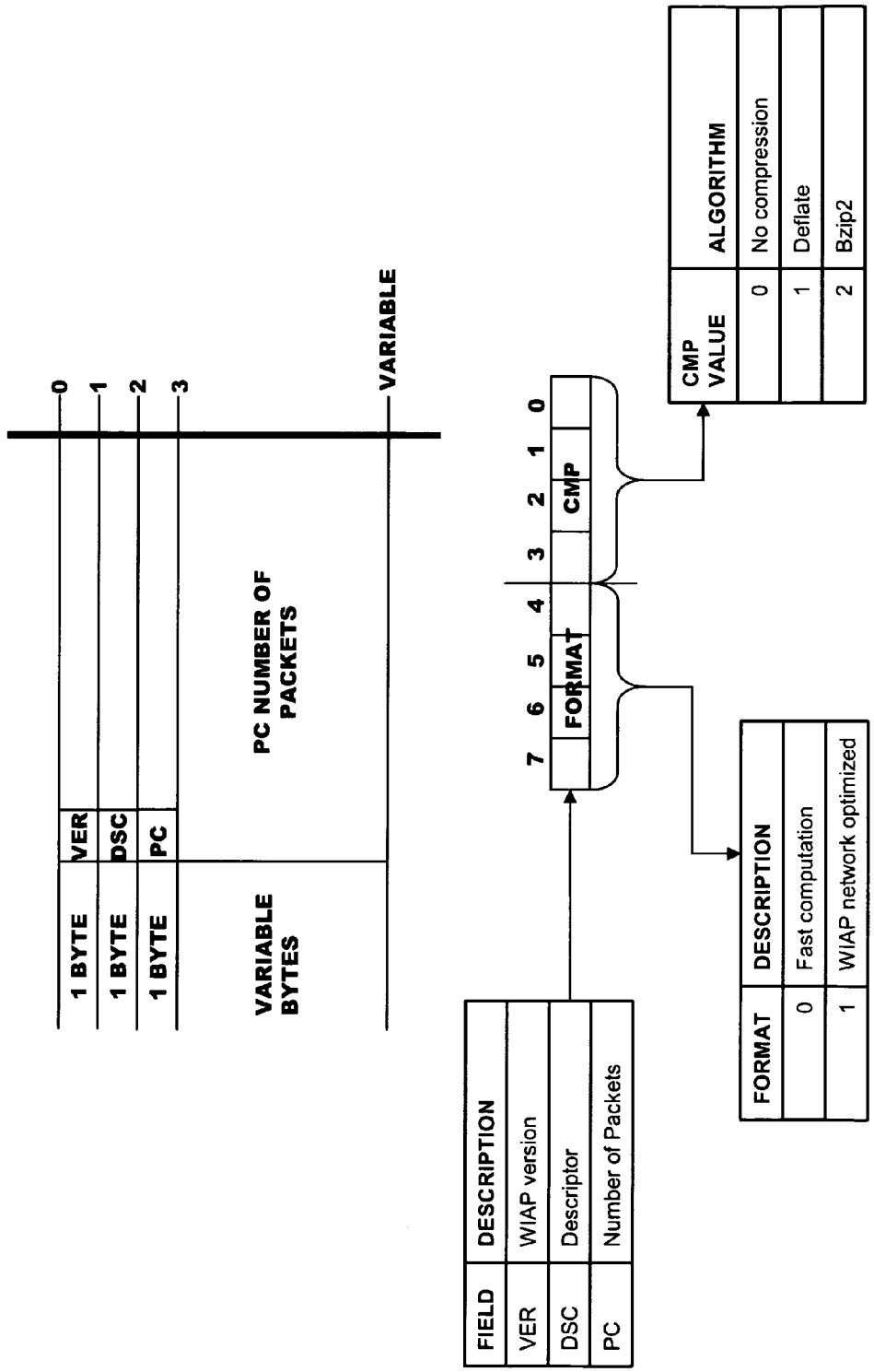
FIG. 24 shows a possible VoIP Concatenation Container Format according to this invention.

FIG. 24 shows a possible VoIP Concatenation Container Format according to this invention.

Figure 25:
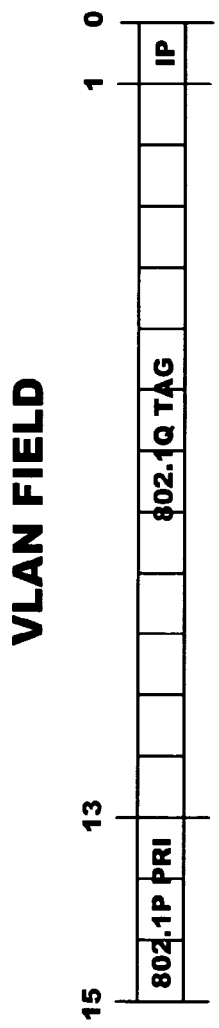
FIG. 25 shows a possible VLAN Field within the VoIP Concatenation Container Format according to this invention.

FIG. 25 shows a possible VLAN Field within the VoIP Concatenation Container Format according to this invention.

Therefore, methods and architectures for managing latency and jitter on wireless LANs have been described.

It should be understood that the particular embodiments described above are only illustrative of the principles of the present invention, and various modifications could be made by those skilled in the art without departing from the scope and spirit of the invention. Thus, the scope of the present invention is limited only by the claims that follow:

What is claimed is:

1. A method for transferring voice packets between a primary voice wireless access point and a plurality of voice client devices, comprising:

dedicating the voice wireless access point solely to voice communication;

assigning, relative to an access point beacon packet timing position, unique time slots for each voice client device to first monitor for a conflicting transmission then attempt to send their voice packets to the primary wireless access point;

assigning, relative to said access point beacon packet timing position, a block receive time slot for the primary wireless access point to first monitor for a conflicting transmission then attempt to send concatenated voice packets to all of said plurality of voice client devices simultaneously;

performing collision detection; and in the event that a collision is detected between a voice client device and another device, backing off transmission from the at least one of the plurality of voice client devices according to a contention window that is at least in part governed by a random number scheme.

2. The method of claim 1 further including:

concatenating voice packets that are to be sent to voice client devices;

sending concatenated voice packets from the primary wireless access point to all voice client devices simultaneously during the assigned block receive time slot; and de-concatenating said concatenated voice packets, performed by each voice client device, such that each voice client device extracts the voice information intended specifically for that voice client device.

3. The method of claim 1 further including:

scanning to evaluate possible connections to alternative wireless access points, performed by a specific voice client device during unallocated time slots that are not assigned to that specific voice client device.

4. The method of claim 3 where scanning to evaluate possible connections to alternative wireless access points occurs on other channels than the current channel used to connect to the primary wireless access point.

5. The method of claim 3 further including:

locating, during the process of scanning for alternative wireless access points, an alternative wireless access point offering a connection with higher signal strength compared to that of the current connection with the primary wireless access point; and sending a request for a change of connection to the alternative access point by way of the heartbeat information packet mechanism of a wireless mesh network wherein said request is relayed from one wireless mesh access point to another, until said request reaches said alternative wireless access point offering a connection with higher signal strength; and changing the connection such that the specific voice client device connects with the alternative wireless access point instead of the primary access point.

6. The method of claim 5 where said alternative wireless access point transmits and receives on a different channel than the current channel used to connect to the primary wireless access point.

7. The method of claim 1 further including:
Transferring data to and from an alternative wireless access point, performed by a specific voice client device during unallocated time slots that are not assigned to the specific voice client device.

8. The method of claim 7 where transferring data to and from an alternative wireless access point occurs on other channels than the current channel used to connect to the primary wireless access point.

9. The method of claim 7 wherein both the primary voice wireless access point and alternative data wireless access point exist as separate access point radios within an integrated access point unit.

10. The method of claim 9 where the primary and alternative wireless access points operate on different channels.

11. The method of claim 1 in the event that the collision is detected, the method further comprising backing off transmission from the device other than the plurality of voice client devices according to the contention window.

12. A method for transferring voice packets between a primary wireless access point and a plurality of voice client devices, comprising:
assigning, relative to an access point beacon packet timing position, unique time slots for each voice client device to send their voice packets to the primary wireless access point;
assigning, relative to said access point beacon packet timing position, a block receive time slot for the primary wireless access point to send concatenated voice packets to all of said plurality of voice client devices simultaneously;
concatenating voice packets that are to be sent to voice client devices;
monitoring for a conflicting transmission;
sending concatenated voice packets from the primary wireless access point to all voice client devices simultaneously during the assigned block receive time slot if a wireless medium is available for transmission;
de-concatenating said concatenated voice packets, performed by each voice client device, such that each voice client device extracts the voice information intended specifically for that voice client device;
scanning to evaluate possible connections to alternative wireless access points, performed by a specific voice client device during unallocated time slots that are not assigned to that specific voice client device;
performing collision detection; and
in the event that a collision is detected between a device other than the plurality of voice client devices and the plurality of voice client devices, backing off transmission from the at least one of the plurality of voice client devices according to a contention window that is at least in part governed by a random number scheme.

13. The method of claim 12 where scanning to evaluate possible connections to alternative wireless access points occurs on other channels than the current channel used to connect to the primary wireless access point.

14. A method for transferring voice packets between a primary wireless access point and a plurality of voice client devices, comprising:
assigning, relative to an access point beacon packet timing position, unique time slots for each voice client device to send their voice packets to the primary wireless access point;
assigning, relative to said access point beacon packet timing position, a block receive time slot for the primary wireless access point to send concatenated voice packets to all of said plurality of voice client devices simultaneously;
concatenating voice packets that are to be sent to voice client devices;
monitoring for a conflicting transmission;
sending concatenated voice packets from the primary wireless access point to all voice client device simultaneously during the assigned block receive time slot if a wireless medium is available for transmission;
de-concatenating said concatenated voice packets, performed by each voice client devices, such that each voice client device extracts the voice information intended specifically for that voice client device;
transferring data to and from an alternative wireless access point, performed by a specific voice client device during unallocated time slots that are not assigned to that specific voice client device;
performing collision detection; and
in the event that a collision is detected between a device other than the plurality of voice client devices and the plurality of voice client devices, backing off transmission from the at least one of the plurality of voice client devices according to a contention window that is at least in part governed by a random number scheme.

15. The method of claim 14 where transferring data to and from an alternative wireless access point occurs on other channels than the current channel used to connect to the primary wireless access point.

16. The method of claim 2 wherein a voice client device:
sends voice packets on a first channel to a first wireless access point;
sends data packets on a second channel to a second wireless access point;
receives data packets on a second channel from a second wireless access point; and
receives concatenated voice packets on a second channel from a second wireless access point.

* * * * *